US011969875B1

(12) United States Patent
Gess

(10) Patent No.: US 11,969,875 B1
(45) Date of Patent: Apr. 30, 2024

(54) MECHANIC'S CREEPER

(71) Applicant: John Gess, Lakewood, CO (US)

(72) Inventor: John Gess, Lakewood, CO (US)

( * ) Notice: Subject to any disclaimer, the term of this patent is extended or adjusted under 35 U.S.C. 154(b) by 0 days.

(21) Appl. No.: 18/345,545

(22) Filed: Jun. 30, 2023

(51) Int. Cl.
*B25H 5/00* (2006.01)
*F21V 33/00* (2006.01)

(52) U.S. Cl.
CPC ............. *B25H 5/00* (2013.01); *F21V 33/008* (2013.01)

(58) Field of Classification Search
CPC ....... B25H 5/00; F21V 33/008; F21V 17/105; F21V 17/164; B62B 5/0093; B62B 3/02; B62B 2205/30; B60Q 3/57; B60Q 3/53; B60Q 3/40; B60Q 1/2615; B60Q 1/2642; B60Q 1/2646; B60Q 1/2692
See application file for complete search history.

(56) References Cited

U.S. PATENT DOCUMENTS 2,475,266 A * 7/1949 Williams ................. B25H 5/00 219/217
2,636,705 A * 4/1953 Stanton ................... F21V 21/00 280/32.6
4,232,357 A * 11/1980 Dietz ........................ F21S 9/02 362/486
4,986,558 A * 1/1991 Morris ..................... B25H 5/00 280/32.6
5,330,211 A * 7/1994 Nicholson ................ B25H 5/00 280/32.6
5,392,201 A * 2/1995 Morley ................... F21V 21/06 362/486
5,494,305 A * 2/1996 Chen ........................ B25H 5/00 280/32.6
5,503,415 A * 4/1996 Powell ..................... B25H 5/00 280/32.6
5,624,126 A * 4/1997 Vosbikian ................ B25H 5/00 280/32.6
6,238,069 B1 * 5/2001 Miles ....................... B25H 5/00 362/225
6,540,378 B2 * 4/2003 Alsup ...................... B25H 5/00 280/32.6
6,837,383 B1 * 1/2005 McElhaney, Jr. ........ B25H 5/00 211/70.6
(Continued)

FOREIGN PATENT DOCUMENTS

CN 106737529 A * 5/2017 .............. B25H 5/00
CN 107443349 A * 12/2017
(Continued)

*Primary Examiner* — Steve Clemmons
(74) *Attorney, Agent, or Firm* — The Bilicki Law Firm, PC; James A. Cairns

(57) ABSTRACT

A creeper including a support member with a head portion and a body portion. A rectangular light housing may be attached to either side or to both sides of the creeper, and may be extended away from, and retracted to, the side or sides. First and/or second carriers may be reversibly attached to the rectangular light housing or the body of the creeper, and may be adapted and configured to hold parts, tools, and other objects of use when working on an apparatus. The creeper may include an electric aperture for connection to an external source of power, a rechargeable battery, and/or solar panels. The creeper may further include a grounded outlet and a USB port that receive power from the electric aperture, solar panels, and/or rechargeable battery.

25 Claims, 14 Drawing Sheets

(56) References Cited

U.S. PATENT DOCUMENTS

| | | | | | |
|---|---|---|---|---|---|
| 7,273,215 | B1 * | 9/2007 | Smith | B25H 3/028 | 280/47.35 |
| 9,126,326 | B1 * | 9/2015 | Bowen | B25H 5/00 | |
| 9,623,551 | B1 * | 4/2017 | Bowen | B25H 5/00 | |
| 9,802,308 | B2 * | 10/2017 | Coutts | B25H 5/00 | |
| 9,925,659 | B1 * | 3/2018 | Clemmer | B25H 5/00 | |
| 10,328,570 | B1 * | 6/2019 | O'Donnell | B25H 5/00 | |
| 10,578,298 | B2 * | 3/2020 | Knight | F21V 33/00 | |
| 11,376,726 | B2 * | 7/2022 | Howard | F21V 33/0084 | |
| 11,458,613 | B2 * | 10/2022 | Martin | B25H 5/00 | |
| 11,628,555 | B1 * | 4/2023 | Williams | B25H 5/00 | 280/32.6 |
| 2006/0028819 | A1 * | 2/2006 | Shankland | B25H 5/00 | 362/253 |
| 2006/0192355 | A1 * | 8/2006 | Hulden | B25H 5/00 | 280/32.6 |
| 2010/0079985 | A1 * | 4/2010 | Prosey | F21V 5/00 | 362/183 |
| 2010/0123293 | A1 * | 5/2010 | Benjamin | B25H 5/00 | 362/228 |
| 2011/0063821 | A1 * | 3/2011 | Prosey | F21S 4/20 | 362/183 |
| 2011/0227303 | A1 * | 9/2011 | Gering | B25H 5/00 | 362/183 |
| 2014/0027990 | A1 * | 1/2014 | Triglia | B62B 3/00 | 362/183 |
| 2015/0159848 | A1 * | 6/2015 | Sieberth | F21V 21/005 | 362/382 |
| 2017/0368677 | A1 * | 12/2017 | Rotenberg | F21V 21/08 | |
| 2021/0338498 | A1 * | 11/2021 | Schwab | B25H 5/00 | |
| 2023/0219211 | A1 * | 7/2023 | Obitts | B25H 5/00 | 280/32.6 |

FOREIGN PATENT DOCUMENTS

| | | | | | |
|---|---|---|---|---|---|
| CN | 107671824 | A | * | 2/2018 | |
| CN | 108381498 | A | * | 8/2018 | |
| CN | 108436873 | A | * | 8/2018 | B25H 5/00 |
| CN | 108724136 | A | * | 11/2018 | |
| CN | 108789344 | A | * | 11/2018 | |
| CN | 109397231 | A | * | 3/2019 | |
| CN | 110385690 | A | * | 10/2019 | B25H 5/00 |
| CN | 209831612 | U | * | 12/2019 | |
| CN | 112276891 | A | * | 1/2021 | |
| CN | 112706144 | A | * | 4/2021 | |
| CN | 212947717 | U | * | 4/2021 | |

* cited by examiner

MECHANIC'S CREEPER

BACKGROUND

Figure 1:
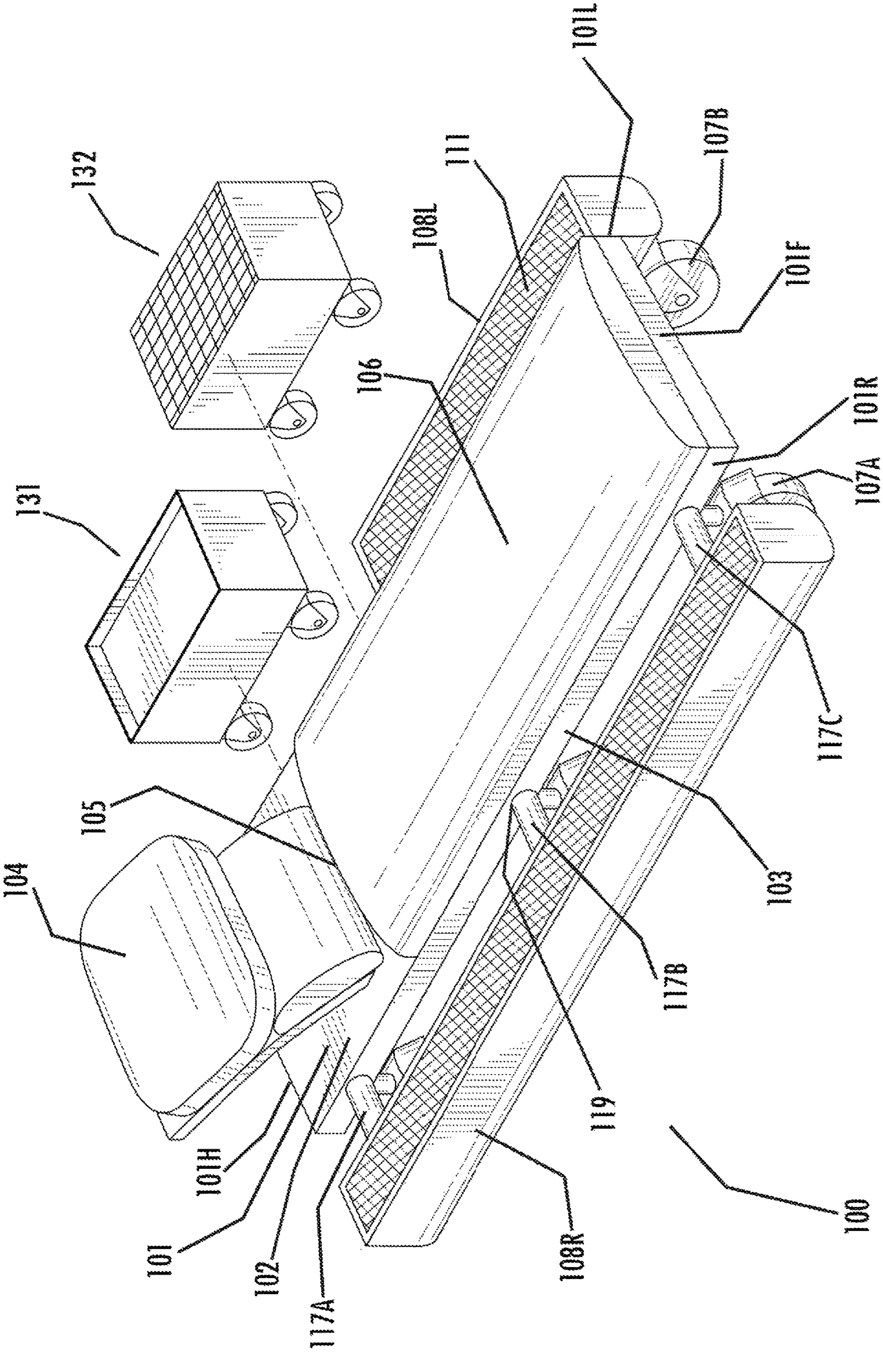
FIG. 1 is a right elevated perspective view of the present mechanic's creeper looking from the foot side towards the head side, including first and second carriers spaced apart from the creeper.

When performing inspections, repairs, maintenance, or other work on an apparatus it may be necessary to sit or lie on the ground to get a better view of the apparatus and/or more readily obtain access to the underside of the apparatus. The floor or other surface where such activities take place, such as the ground, a concrete pad, or a residential or commercial garage, may be uncomfortable for the person performing the maintenance to lie on. The surface may also be dirty from oil, grease, dust, chemicals, and/or other particulate material, and/or have objects such as small parts or tools lying on it, and therefore a person lying or sitting directly on the surface may dirty their clothes or come into contact with items that may be physically or chemically hazardous to their health.

Performing such services can also be challenging due insufficient illumination, which may be aggravated by shadows cast by the apparatus. In addition to making it difficult to see the lower regions of the apparatus, insufficient light beneath an apparatus may make it difficult to identify or locate tools or parts, including those that have been dropped.

One approach to address some of these issues is the use of an apparatus that may be referred to as a mechanic's creeper. A creeper generally has a horizontal surface designed for a person to lie on, and is supported by wheels that allow the creeper to roll in response to force exerted by the person lying on the creeper, usually using their hand(s) and/or foot or feet. The creeper may have a height that enables the person lying on it to roll to a position at least partially under the apparatus.

SUMMARY

The present application is directed to a creeper that includes a support member for a human body, the support member including a left side, a right side, a head side, and a foot side. The support member also includes a head portion, and a body portion extending from the head portion to the foot side.

The head portion of the creeper may include a padded head support, which may be pivotable upwardly from a point adjacent the body portion, between a first position that is substantially horizontal relative to the support member, and a second position at an acute angle to the support member. The creeper may also include a padded body support located on the body portion, and a plurality of wheels mounted to the underside of the support member.

A first rectangular light housing may be connected to the left side of the support member and a second rectangular light housing may be connected to the right side. One of the first rectangular light housing and the second rectangular light housing may extend along substantially the entire length of its respective side of the support member, and the other of the first rectangular light housing and the second rectangular light housing may extend from the foot side of the support member towards the head side to from one-half the length of its respective side, to substantially the entire length of its respective side of the support member. The first rectangular light housing and the second rectangular light housing may each be movable relative to its respective side of the support member between a first, retracted position adjacent the side and a second, extended position horizontally away from the side.

The first rectangular light housing and the second rectangular light housing may each contain at least one light source, which may be, for example, an incandescent light source, a fluorescent light source, a halogen light source, and/or a light-emitting diode light source; and have a reflector located below each light source and a translucent shield located above each light source.

The present creeper may include at least one of (1) a rechargeable battery mounted to the underside of the support member, (2) at least one electric aperture adapted to receive a grounded connection to a source of alternating current, and (3) at least one solar panel mounted to the creeper, with at least one of these three being electrically connected to each light housing.

The present creeper may include a plurality of light housing connectors that connect each of the first light housing and the second light housing to, respectively, the left side and the right side of the support member. Each of the plurality of light housing connectors may have a first end connected to the light housing and a second end connected to the support member.

The light housing connectors may be configured such that (1) each first end has a fixed connection to the light housing and each second end has a movable connection to the support member, (2) each first end has a movable connection to the light housing and each second end has a fixed connection to the support member, (3) each first end has a movable connection to the light housing and each second end has a movable connection to the support member, and/or (4) each first end has a fixed connection to the light housing and each second end has a fixed connection to the support member.

In the configuration where each first end has a fixed connection to the light housing and each second end has a movable connection to the support member, the moveable connection may include an aperture in the side of the support member through which each of the plurality of light housing connectors is movable to move the light housing towards and away from the support member.

Alternatively, where the light housing connector has a movable connection to the support member the movable connection may include a slide rail assembly. The slide rail assembly may have a first end fixedly connected to the light housing, and a second end fixedly connected to the support member. The slide rail assembly may include at least first and second parts that are moveable relative to each other as the light housing moves between its retracted and extended positions.

At least one light housing connector may include an accordion structure having a first end fixedly connected to the light housing and a second end fixedly connected to the support member. The accordion structure may contract and extend when the light housing is moved between retracted and extended positions.

The present creeper may include at least one tray arranged and configured to occupy the horizontal area between the light housing and the support member when the light housing is extended away from the support member. The tray may be attached to the side of the light housing facing the support member, and be configured and arranged to slide under the support member when the light housing is moved to its retracted position adjacent the side. The tray may be configured and arranged to be removably placed into the space between the light housing and the support member when the light housing is extended away from the support member.

Substantially the entire surface of the tray may be perforated, or may be solid and include at least one drain hole at an end of the tray closest to the head side and/or at least one drain hole at an end of the tray closest to the foot side.

The present creeper may include a first carrier and a second carrier, each being rectangular and having a length, a width, and a height, and being adapted to attach to a side of the support member, or a side of a light housing, at a region on their lengths. The combined lengths of the first carrier, the second carrier, and the light housing on the same side of the support member where the first carrier and the second carrier are adapted to attach may be equal to or less than the length of that side of the support member.

The first carrier may include a first flat, horizontal tray portion. The second carrier may include a second flat, horizontal tray portion that includes a third horizontal portion supported vertically above the second flat, horizontal tray portion. The third horizontal portion may include a plurality of apertures, through which tools may be placed, formed by a first plurality of dividers and a second plurality of dividers positioned at an angle to the first plurality of dividers.

The present creeper may include a third light housing having a length equal to the combined lengths of the first carrier and the second carrier and adapted to be attached to and removed from the side of the support member where the first carrier and the second carrier are adapted to attach.

The first carrier and the second carrier may be removably attached to a side of the support member or light housing by at least one of (1) a first magnetic portion on a side of the carrier and a second magnetic portion on an outside side wall portion of the light housing; (2) a spring clip on a side of the carrier adapted to be brought over an outside side wall portion of the light housing; and/or (3) a retention member having a first, linear end extending upwardly to a second, U-shaped end. The linear end of the retention member may be adapted to be attached to at least one of (a) a side of the carrier and (b) an outside side wall portion of the support member or light housing, while the second, U-shaped end may be adapted to be placed over, respectively, an outside side wall portion of the light housing, and a side wall portion of the carrier or support member.

The present creeper may include at least one electric aperture adapted to receive a grounded connection to a source of alternating current, and at least one grounded outlet electrically connected to the at least one electric aperture.

The present creeper may include a rechargeable battery mounted to the underside of the support member, a snake light mounted adjacent the head portion, and at least one solar panel attached to a light housing through a hinged connection that is configured to allow movement of the solar panel between a first position, in which the solar panel is adjacent to and coplanar with an outside side wall of the light housing, and a second position, in which the solar panel is normal to the outside side wall and coplanar with the support member.

At least one of the electric aperture and the rechargeable battery may be electrically connected to the first light housing, the second light housing, the snake light, and the at least one grounded outlet. Further, the at least one solar panel may be electrically connected to at least one of the rechargeable battery, the first light housing, the second light housing, the snake light, and the at least one grounded outlet.

The rechargeable battery may be removeable from the support member, and configured to be rechargeable while removed.

The present creeper may further include at least one USB port, which may be electrically connected to at least one of the electric aperture, the rechargeable battery, and the at least one solar panel.

The present creeper may alternatively include a planar support for a human body having a left side, a right side, a head side, and a foot side, all connected by a solid surface. The planar support member may include a padded head portion and a padded body portion, with the padded head portion being pivotable upwardly, from a point adjacent the padded body portion, from a first position that is substantially horizontal relative to the planar support to a second position at an acute angle to the planar support.

A plurality of wheels, which may be height-adjustable, may be mounted to the underside of the planar support, and a first rectangular light housing may be connected to the left side with a second rectangular light housing connected to the right side. One of the first rectangular light housing and the second rectangular light housing may extend along substantially the entire length of its respective side of the planar support, while the other may extend from the foot side of the planar support, towards the head side, to from one-half the length of its respective side to substantially the entire length of its respective side of the planar support. Each of the first rectangular light housing and the second rectangular light housing may be movable relative to its respective side of the planar support between a first, retracted position adjacent the side and a second, extended position horizontally away from the side. Each of the first rectangular light housing and the second rectangular light housing may contain at least one light source, which may be, for example, an incandescent light source, a fluorescent light source, a halogen light source, and/or a light-emitting diode light source. A reflector may be located below each light source, and a translucent shield may be located above each light source.

The present creeper may include a plurality of light housing connectors connecting each of the first light housing and the second light housing to, respectively, the left side and the right side of the planar support, wherein each of the light housing connectors includes a first end connected to a light housing and a second end connected to its respective side of the planar support. The light housing connectors may be configured such that (1) each first end has a fixed connection to the light housing and each second end has a movable connection to the side; (2) each first end has a movable connection to the light housing and each second end has a fixed connection to the side; (3) each first end has a movable connection to the light housing and each second end has a movable connection to the side; and/or (4) each first end has a fixed connection to the light housing and each second end has a fixed connection to the side.

In the configuration where each first end has a fixed connection to the light housing and each second end has a movable connection to a side of the planar support, the moveable connection may include an aperture in the side through which each of the plurality of light housing connectors is movable towards and away from the side of the planar support.

The present application is also directed to a creeper having a planar frame that includes a left side rail, a right side rail, a head rail, and a foot rail. The creeper may include a planar support member for a human body that is supported by the planar frame. The planar support member may include a padded head portion and a padded body portion, where the padded head portion is pivotable upwardly, from a point adjacent the padded body portion, from a first position that is substantially horizontal relative to the planar support member to a second position at an acute angle to the planar support member.

A plurality of wheels, which may be height-adjustable, may be mounted to the underside of at least one of the planar frame and the planar support member.

The present creeper may include a first rectangular light housing that is connected to the left side rail, and a second rectangular light housing connected to the right side rail, with one of the first rectangular light housing and the second rectangular light housing extending along substantially the entire length of its respective side rail, while the other light housing extends from the foot rail towards the head rail to from one-half the length of its respective side rail, to substantially the entire length of its respective side rail of the planar support member. Each of the first rectangular light housing and the second rectangular light housing may be movable relative to its respective side rail between a first, retracted position adjacent the side rail and a second, extended position horizontally away from the side rail.

Each of the first rectangular light housing and the second rectangular light housing may include at least one light source, which may be, for example, an incandescent light source, a fluorescent light source, a halogen light source, and/or a light-emitting diode light source. A reflector may be located below each light source, and a translucent shield maybe located above each light source.

DETAILED DESCRIPTION

The present application is directed to an apparatus that may be referred to as a mechanic's creeper. A creeper generally has a horizontal surface on which a person may lie flat, usually face-up. A creeper also usually has wheels on which the creeper may be rolled across the floor, and the person lying on the creeper may roll it by pressing their hands and/or feet against the floor, and/or by engaging their feet and/or hands with the apparatus the creeper is being used to work on, or a nearby wall, tool chest, or other object. A mechanic's creeper can simplify access to the underside of such an apparatus for purposes such as inspection, repair/replacement, and maintenance.

When used herein in the context of an apparatus that the creeper is being used to work on, "apparatus" generally means any physical object having a region where work is needed that can be more readily accessed on a creeper than standing or sitting. Examples include, but are not limited to, vehicles such as cars, buses, and trucks; boats in drydock; industrial installations; and structural features having a crawlspace in which a creeper may be used.

For purposes of convenience the person using creeper may be referred to herein as a "mechanic", however, as used herein that term simply means any person using a creeper, including a person who owns, leases, or rents an apparatus and is performing work on that apparatus for themselves or on behalf of another.

Creepers may be constructed in a number of ways. In one approach the body of the creeper may be a solid or substantially solid, generally rectangular, support member made of wood, plastic, metal, or any other suitable material. The mechanic may lie directly on the support member, or on a support placed on the support member. In another approach the body of the creeper may be a framework, such as a frame of tubular or rectangular pieces, usually though not necessarily of metal. The framework may provide a support for a solid support member. As used herein, "solid" is used in contrast to "frame" or "framework"; includes but is not limited to an unbroken surface; and also includes a surface with apertures for screws, nails, bolts, or other connectors; hand grips; apertures for conservation of material in construction; apertures for weight reduction; and the like.

It is helpful or even necessary for a mechanic to have sufficient illumination to clearly see the part or parts of the apparatus being inspected, repaired, or maintained. Illumination can be challenging while using a creeper because the mechanic's head may be at least partially under the apparatus, with ambient light in the surrounding environment being obstructed by the apparatus, the creeper, and/or the mechanic.

It takes some effort to lie down and, and stand up from, a creeper, making it desirable to minimize the number of such transitions that need to be made while undertaking a given piece of work. In the course of carrying out a particular job a mechanic may need lighting, which may be of different amounts and/or directed to different locations; tools, which the mechanic may need to pick up and then store, if only temporarily, when their immediate use is over; and parts, which may be parts to be attached to the apparatus and/or parts that have been removed from the apparatus.

FIG. 1 shows creeper 100 having support member 101, having head side 101H, foot side 101F, right side 101R, and left side 101L. (References herein to the "left" and "right" side of the creeper are from the perspective of a person lying face-up on the creeper.)

Support member 101 has head portion 102 and body portion 103, with body portion 103 extending from head portion 102 to foot side 101F. Head support 104, which may be padded, is located on head portion 102, and body support 106, which may be padded, is located on body portion 103. Head support 104 may be pivotable upwardly, from point or region 105 adjacent body portion 103, from a first, horizontal position resting on support member 101, to a second, inclined position at an acute angle to support member 101. As used herein, "acute" refers to the angle between head support 104 and the horizontal surface of support member 101. The acute angle may be any angle greater than 0 degrees and less than 90 degrees that is consistent with the use to which the creeper is being put and is supported by the pivoting mechanism used. Representative but non-limiting angles include 10, 15, 20, 25, 30, 35, 40, and 45 degrees upward from the horizontal, as well as angles intermediate to those values.

A plurality of wheels including 107A and 107B may be mounted to the underside of support member 101. The number of wheels will usually be at least four and no more than six, but any suitable number and placement of wheels that provides stability and motility for the creeper may be used. The wheels on the creeper and carriers described herein may incorporate any conventional height-adjustment mechanism.

The creeper includes first rectangular light housing 108L connected to left side 101L of support member 101, and second rectangular light housing 108R connected to right side 101R of support member 101. Either light housing or both light housings may extend along substantially the entire side of the support member, or either light housing or both light housings may extend partially along the side. As shown in FIG. 1, first rectangular light housing 108L extends partially along the length of left side 101L of support member 101, while second rectangular light housing 108R extends along substantially the entire length of right side 101R of the support member. As used herein, "substantially along the entire length" means between 80 percent and 110 percent, inclusive, of the referenced dimension or element, and therefore includes extending beyond head side 101H and/or foot side 101F. Each light housing will include at least one light source and may include a translucent shield, shown in FIG. 1 for first rectangular light housing 108L as 111, located above the light source.

The light housings are connected to the support member by a plurality of light housing connectors such as 117A, 117B, and 117C. Any number and placement of light housing connectors that provide suitable support for the light housings and enable movement of the light housings towards and away from the support member may be used. As shown in FIG. 1, light housing connector 117B is connected to right side 101R of support member 101 through aperture 119, and is depicted as a tubular member that is slidable through aperture 119. However, any suitable form of connection may be used, including a fixed connection. As used herein, a "connection" of a light housing support means any physical connection between a light housing support and a light housing on one hand and a support member on the other hand, and may be a movable connection as in FIG. 1 or fixed connection.

FIG. 1 also shows first carrier 131 and second carrier 132. Both carriers, only one carrier, or no carriers may be present in the creeper as described herein, and may be located in either side, or on both sides, of the creeper. A carrier may provide a flat, horizontal tray portion as in first carrier 131, which may be used to hold parts and/or tools. Alternatively, a carrier may provide apertures as in second carrier 132 through which tools may be placed, and may then further include a flat, horizontal bottom to prevent tools from falling through the apertures. The apertures may be provided in any suitable manner, including but not limited to providing a plurality of dividers, such as wires or metal or plastic strips, placed at angles to each other to form a cross-hatched structure as shown in FIG. 1. The carriers may have wheels located on their undersides to enable rolling them on the floor, which may be height-adjustable. In the configuration shown in FIG. 1, each carrier has a wheel at each of the four corners of the underside (with the fourth wheel not visible), but any number and placement of wheels may be used that enables the carriers to be rolled and stable, that is, resistant to tipping.

As indicated by the dotted lines in FIG. 1, the carriers may be moved to, and away from, a position adjacent to support member 101, with first rectangular light housing 108L having a complementary length; that is, a length that, when combined with the lengths of the carrier or carriers also present, extends along substantially the entire length of the support member. It is also within the present scope for the carrier or carriers to be located at any point along the length of the support member, though for purposes of convenience of access by the mechanic will usually be located in the general region of head portion 102. Alternatively, the carrier or carriers may be moved to, and away from, a position adjacent to a rectangular light housing rather than the support member. The carrier or carriers may be removably attached to the support member or light housing in any suitable manner, including but not limited to a magnetic connection, a spring clip, or a U-shaped retention member.

Figure 2:
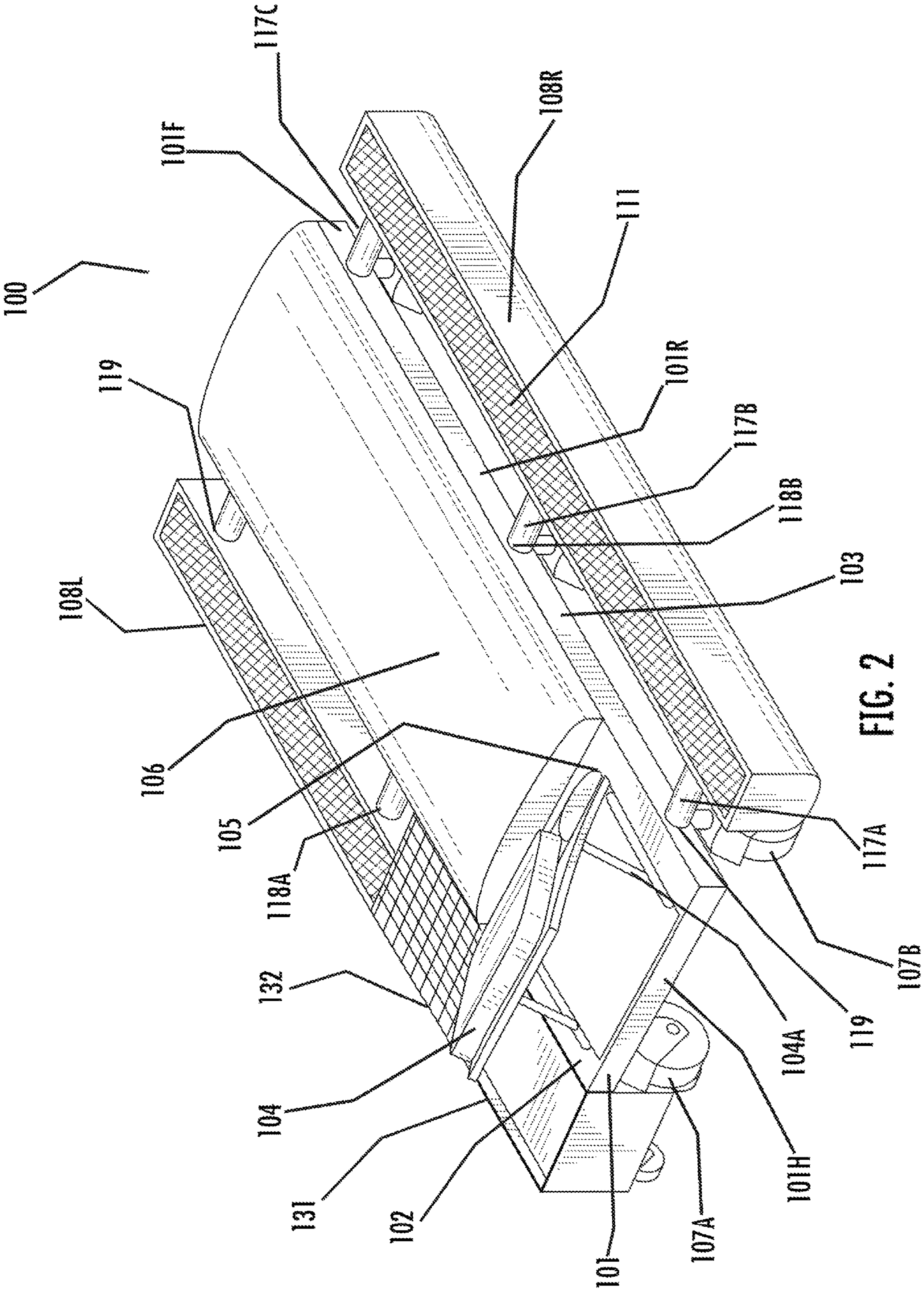
FIG. 2 is a right elevated perspective view of the present mechanic's creeper looking from the head side towards the foot side, including first and second carriers adjacent the creeper.

FIG. 2 is another view of creeper 100 with support member 101 including head side 101H, foot side 101F, and right side 101R (the left side not being visible in this view). A plurality of wheels including 107A and 107B are mounted to the underside of support member 101. Also shown are head portion 102, body portion 103, and head support 104 located on head portion 102, with body support 106 located on body portion 103. Head support 104 is again shown in an upwardly-pivoted position, supported by height adjustment mechanism 104A, pivoting at point 105 adjacent body portion 103.

First rectangular light housing 108L is connected to the left side of support member 101 (not visible in this view), with second rectangular light housing 108R connected to right side 101R of support member 101. Each rectangular light housing may include translucent shield 111 located above a light source contained in the rectangular light housing. First rectangular light housing 108L extends from foot side 101F of support member 101 part-way towards head side 101H, with second carrier 132 adjacent first rectangular light housing 108L and first carrier 131 adjacent second carrier 132. In this view, first carrier 131 and second carrier 132 are shown in a position adjacent to the left side of support member 101. As previously explained, first carrier 131 and/or second carrier 132 may be positioned anywhere along the side of the support member, including in the middle, in which case the rectangular light housing may have two parts, one located on either side of the two carriers, or only one part located on one side of the carriers.

The light housings are connected to the support member by a plurality of light housing connectors including 117A, 117B, and 117C. Each light housing connector may have a first end 118A connected to the light housing and a second end 118B slidably connected to the support member, such as through an aperture 119.

Figure 3:
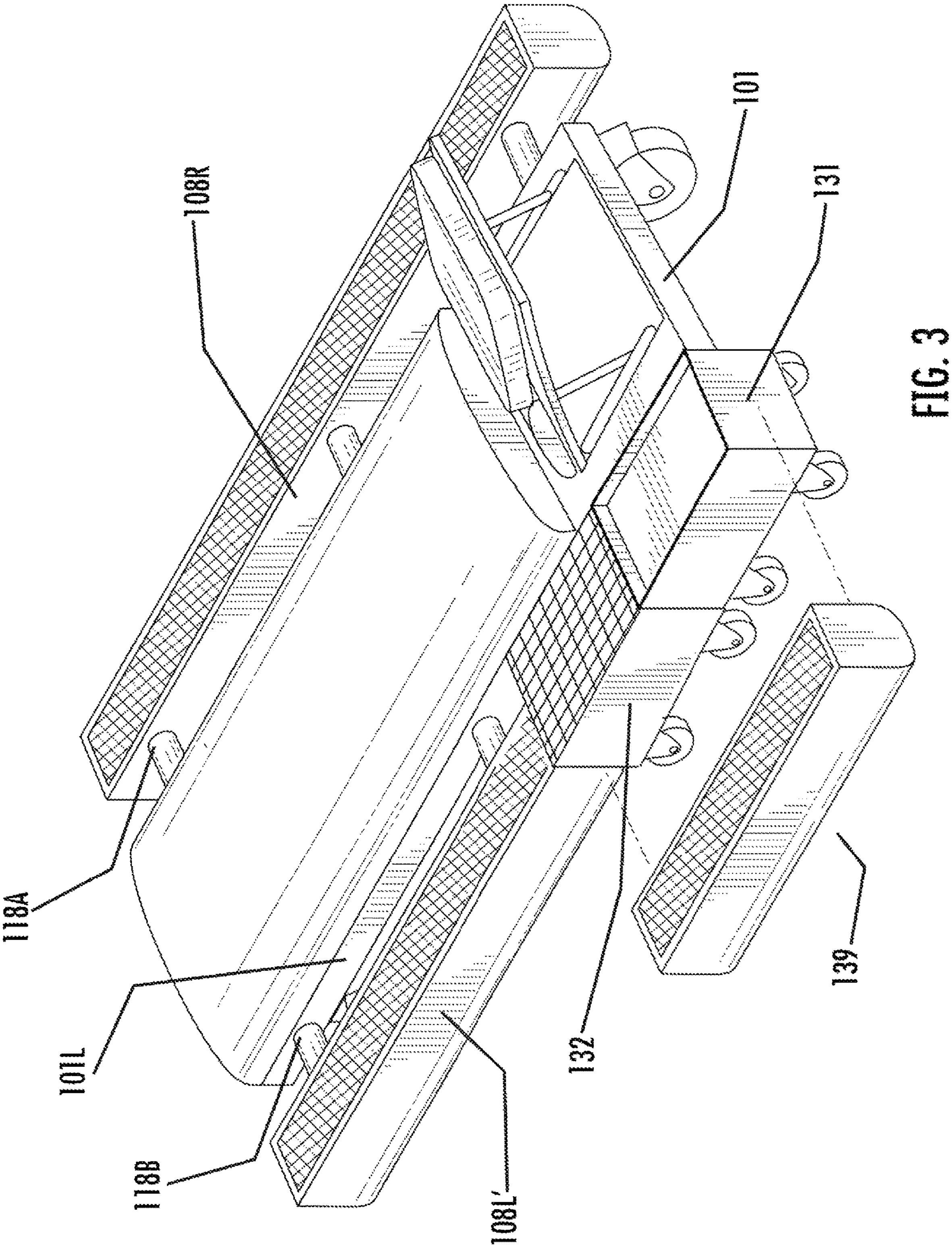
FIG. 3 is a left elevated perspective view of the present mechanic's creeper looking from the head side towards the foot side, including first and second carriers adjacent the creeper that can be exchanged with a light housing.

FIG. 3 is essentially a left-side perspective view of FIG. 2, looking from the head end towards the foot end, including left light housing 108L' whose length, as previously discussed, allows for first carrier 131 and second carrier 132 to be placed adjacent support member 101 such that left light housing 108L', first carrier 131, and second carrier 132 extend along substantially the entire length of left side 101L of support member 101. Also shown is third rectangular light housing 139, which may have a length substantially equal to the combined lengths of first carrier 131 and said second carrier 132 and be exchangeable with them. In this way the mechanic may select between a first configuration in which the creeper has rectangular light housings on both sides that extend along substantially both the left and right sides of support member 101, and a second configuration in which one side of the creeper (left or right) has a rectangular light housing that extends along substantially the entire side, and the other side of the creeper has a rectangular light housing that extends along part of the side and first and second carriers that extend along the remainder of the side. Also shown in FIG. 3 is an example of a first end 118A of one of the light housing connectors that is connected to the rectangular light housing (here, rectangular light housing 108R), and a second end 118B that is connected to a side of support member 101.

Figure 4:
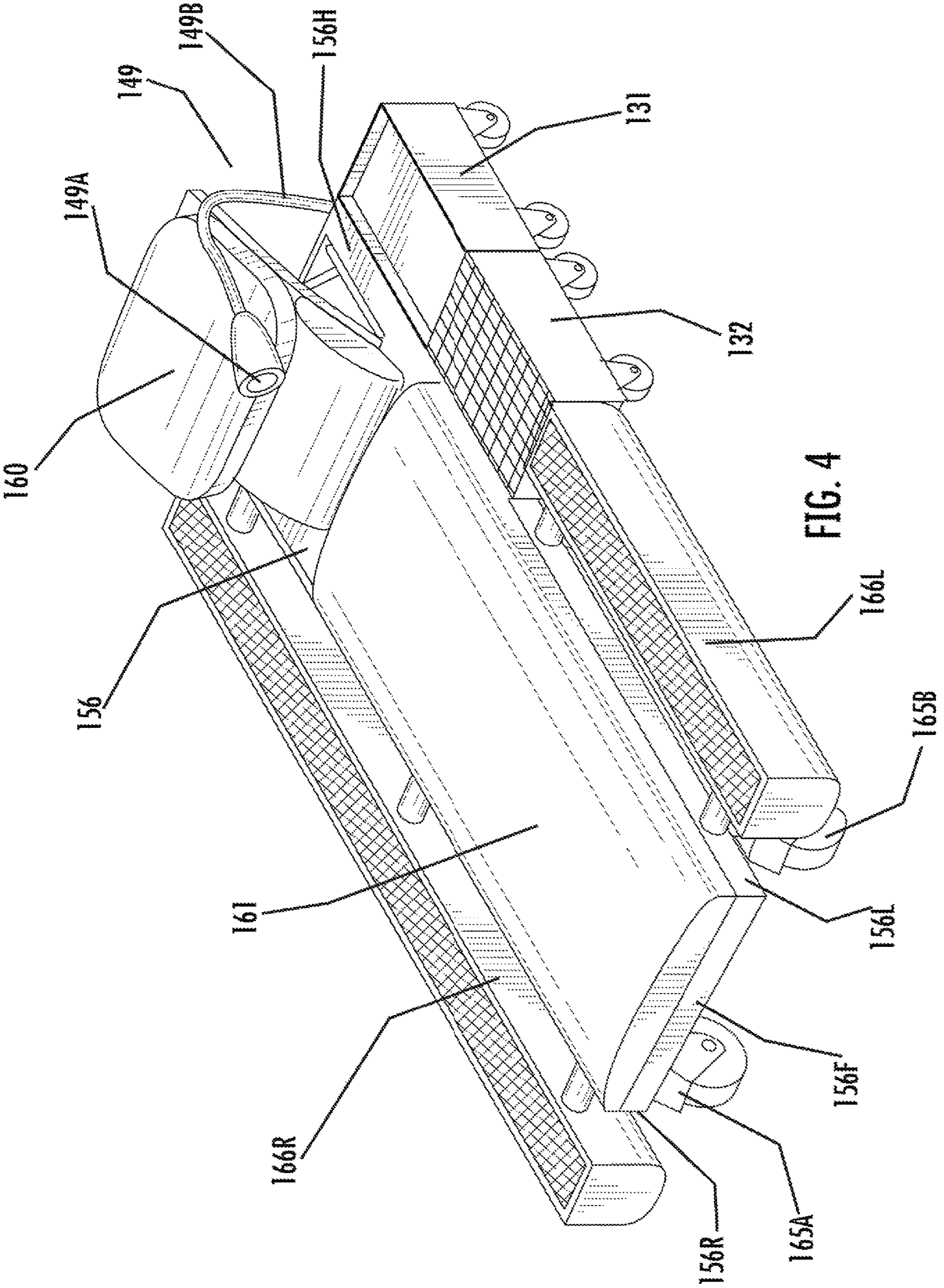
FIG. 4 is a left elevated perspective view of the present mechanic's creeper looking from the foot side towards the head side, including first and second carriers adjacent the creeper and a snake light adjacent the head.

FIG. 4 shows an example of the present creeper from another left-side perspective view, looking from the foot end towards the head end. Support member 156 includes head side 156H, foot side 156F, left side 156L, and right side 156R. A plurality of wheels including 165A and 165B are mounted to the underside of support member 156. Also shown are padded head portion 160; padded body portion 161; first rectangular light housing 166L; first carrier 131 and second carrier 132 adjacent left side 156L of support member 156 and extending along that side from first rectangular light housing 166L; and second rectangular light housing 166R. In this example the present creeper includes snake light 149, having source of illumination 149A and flexible neck 149B, allowing a mechanic to position source of illumination 149A as desired. Snake light 149 may be located at any suitable location on the creeper, including for example the left or right side of the head end, or the left or right side of the creeper, usually though not necessarily along the head region.

Figure 5:
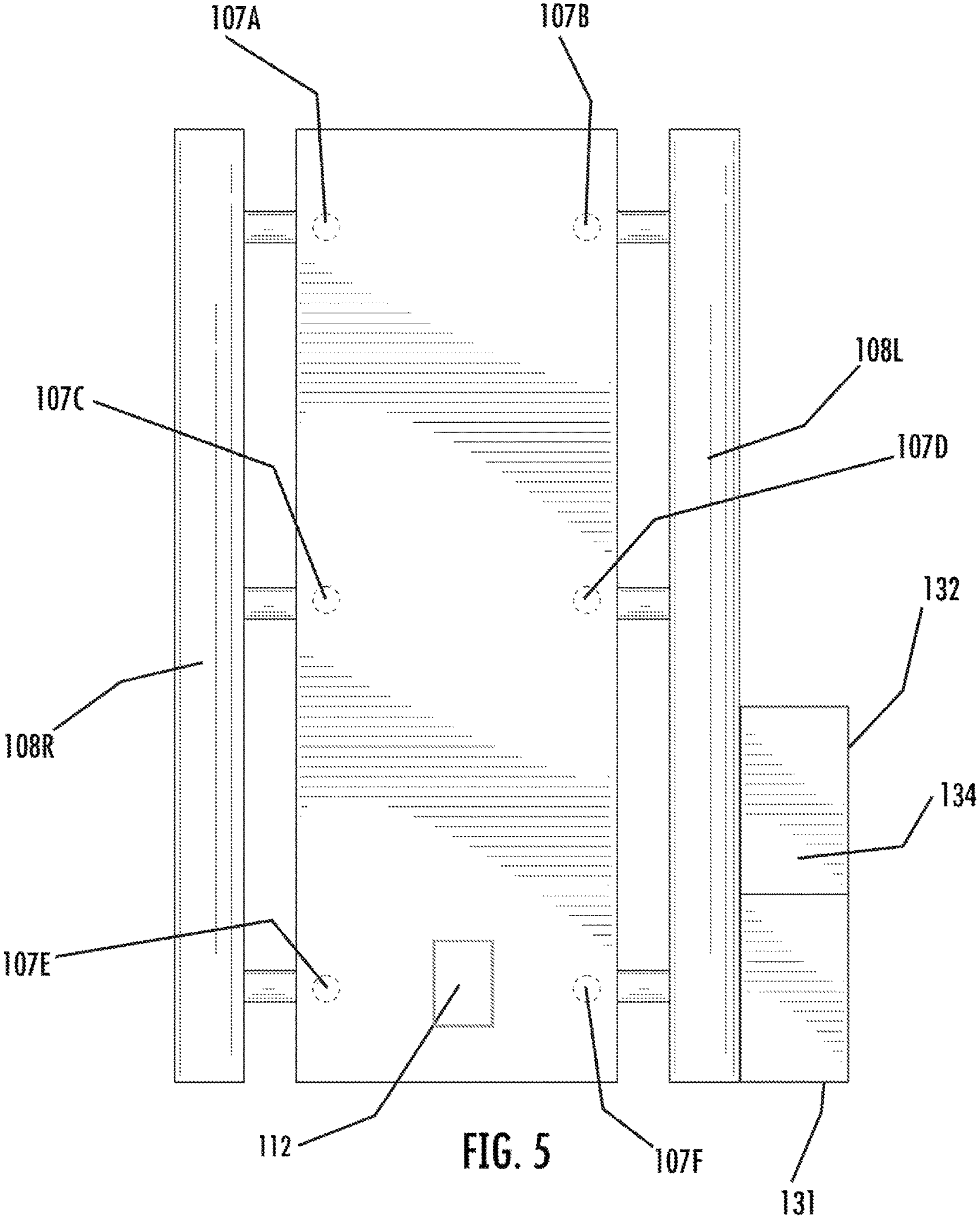
FIG. 5 is a view of the underside of the present mechanic's creeper, including first and second carriers adjacent a light housing.

FIG. 5 shows a bottom view of the present creeper, including possible locations for wheels 107A, 107B, 107C, 107D, 107E, and 107F. Any number and location of wheels besides that shown here may be used, with the only limiting factor being that the wheels provide stability to the creeper (i.e., resist or prevent tipping) and enable reasonably free movement of the creeper. Also shown are first rectangular light housing 108L and second rectangular light housing 108R, with first carrier 131 and second carrier 132 shown adjacent first rectangular light housing 108L; as previously noted, the carriers may alternatively be adjacent second rectangular light housing 101R, and at any desired location along each side. Also shown is replaceable battery 112, which may be mounted to the underside of the creeper at any suitable location.

Figure 6:
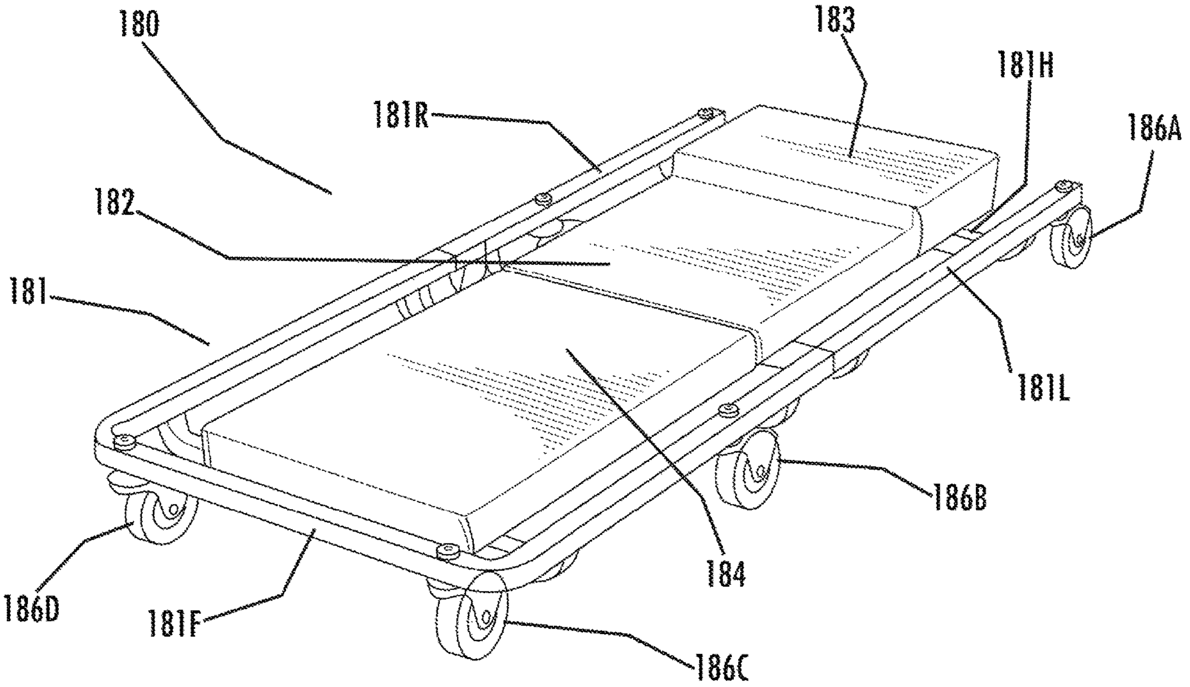
FIG. 6 is a view of an embodiment of the present mechanic's creeper with a support platform/padding supported by a planar frame.
Figure 7:
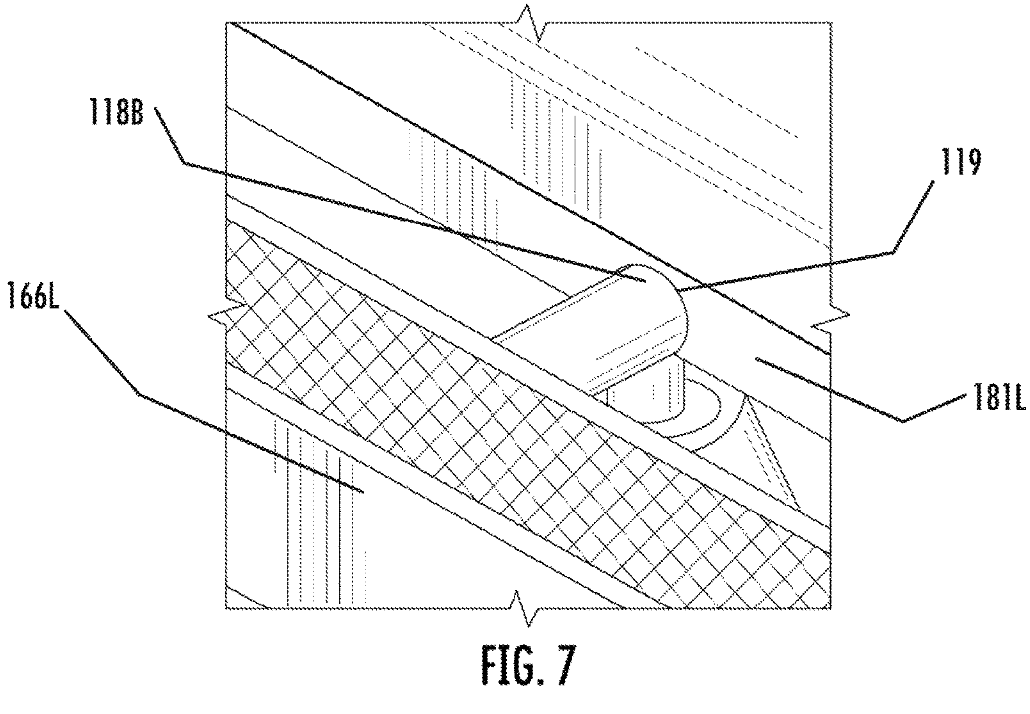
FIG. 7 is a detail view of the present mechanic's creeper showing a connection between a light housing and a support member.

FIG. 6 shows an embodiment of the present creeper using a support member that is supported by a frame. Here, creeper 180 includes planar fame 181 that supports planar support member 182, which has padded head portion 183 and padded body portion 184. Planar fame 181 includes head side 181H, foot side 181F, left side 181L, and right side 181R. Attached to the underside of planar frame 181 are a plurality wheels including 186A, 186B, 186C, and 186D. It will be appreciated that in this embodiment the rectangular light housings, carriers, snake light, rechargeable battery, and similar features may be attached to the planar frame rather than to a support member. For example, FIG. 7 shows rectangular light housing 166L attached to left side 181L of the frame via second end 118B extending through aperture 119 in left side 181L.

Figure 8:
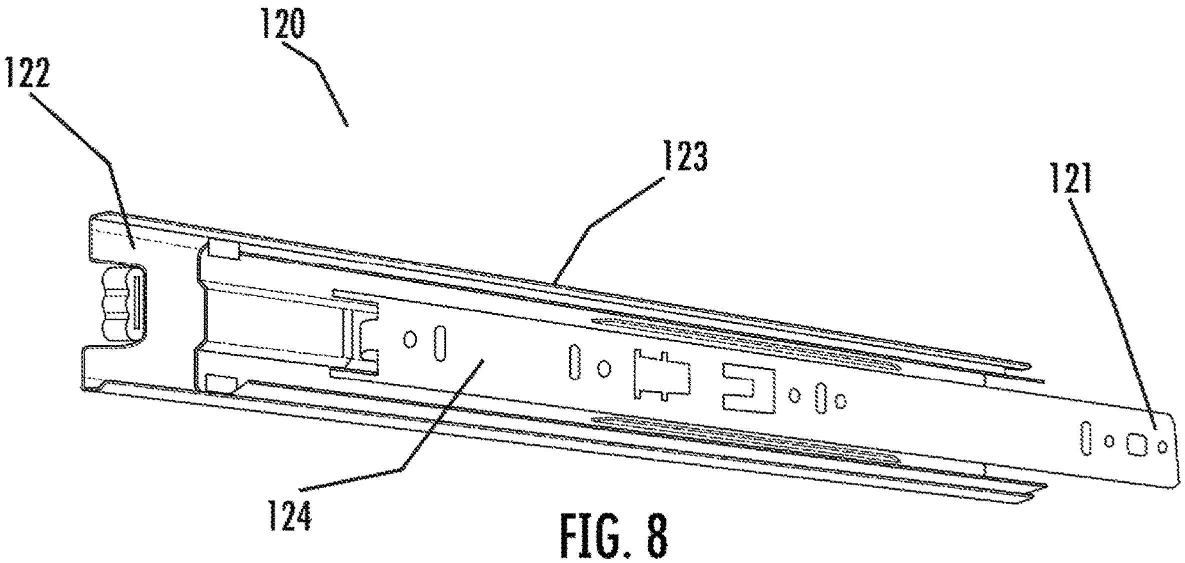
FIG. 8 is a view of a slide rail assembly.
Figure 9:
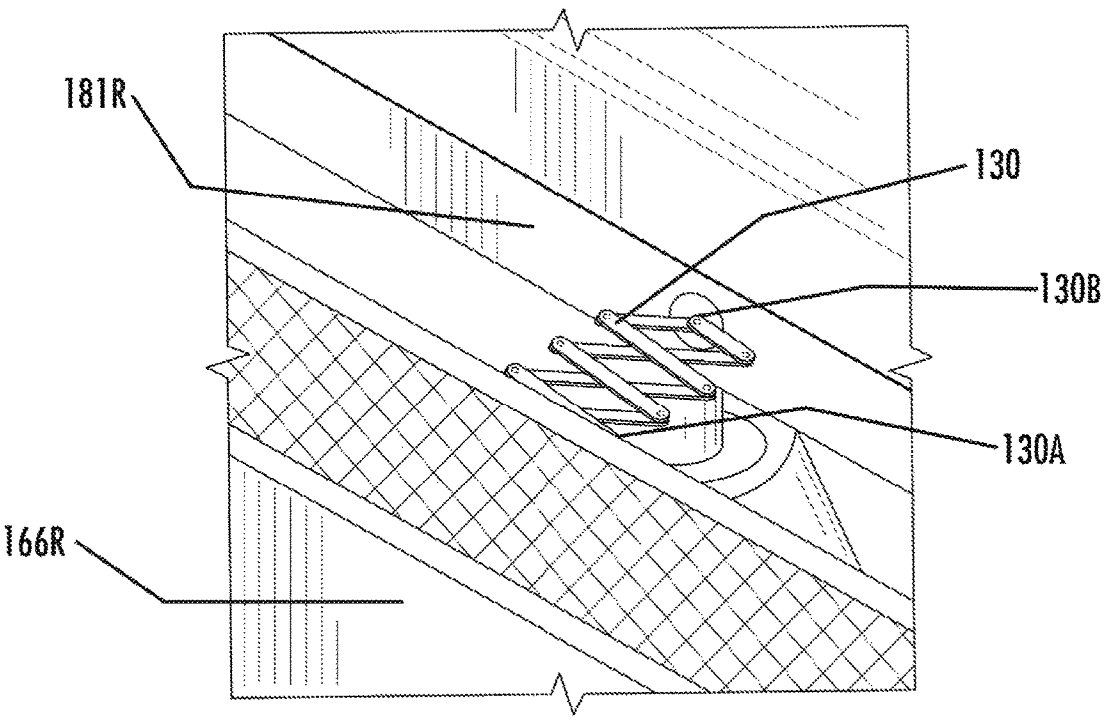
FIG. 9 is a view of an accordion structure.

The rectangular light housings may be attached to the support member, planar support, or planar frame (which may herein be collectively referred to as the "body" of the creeper) by any suitable mechanism that allows the light housing to be extended away from, and retracted next to, the side of the creeper body. The previous figures have generally shown use of a light housing connector having a tubular or cylindrical shape, with one end being fixedly connected to either the rectangular light housing or the side of the body and the other end being movably connected to either the side of the body or the rectangular light housing, respectively. FIG. 8 shows an alternative rectangular light housing connector, namely a slide rail assembly 120, having first end 121, second end 122, and at least first part 123 and second part 124 movable relative to each other. In the embodiment shown in FIG. 8, if first end 121 is fixedly connected to a rectangular light housing and second end 122 is fixedly connected to the creeper body, second part 124 may slide within first part 123 as the rectangular light housing is moved towards or away from the creeper body. FIG. 9 shows another alternative rectangular light housing connector in the form of expanding accordion structure 130, which includes first end 130A fixedly connected to rectangular light housing 166R and second end 130B fixedly connected to right side 181R of the creeper body. Additional configurations and arrangements will be apparent to those of skill in the art and are within the present scope.

The illumination in the rectangular light housings, and/or other illumination such as a snake light, may be activated and deactivated by a manual switch accessible to the mechanic when lying on the creeper. Alternatively, activation may take place by way of a pressure switch placed on the creeper such that the weight of a mechanic's head or body lying down on the creeper activates the switch and the illumination, and the pressure switch may be configured to turn off the illumination when the mechanic gets off the creeper. Alternatively, the illumination in the rectangular light housings may be activated when the housings are extended from the creeper, and deactivated when they are retracted next to the creeper, including but not limited to by a pressure switch, such as a switch on one of the facing sides of the rectangular light housing and the side of the creeper, that is triggered when a light housing moves away from, and/or returns to, the side of the creeper. The light housings may also be configured to illuminate in sections rather than or in addition to all-at-once, such as in thirds (upper, middle, lower) or halves (upper and lower). The light source in the rectangular light housing may be of a single wavelength or have selectable wavelengths, including but not limited to those commonly referred to as soft white, daylight, bright white, warm white, and cool white, as well as non-white wavelengths such as red, green, and blue, and may be dimmable.

Figure 10:
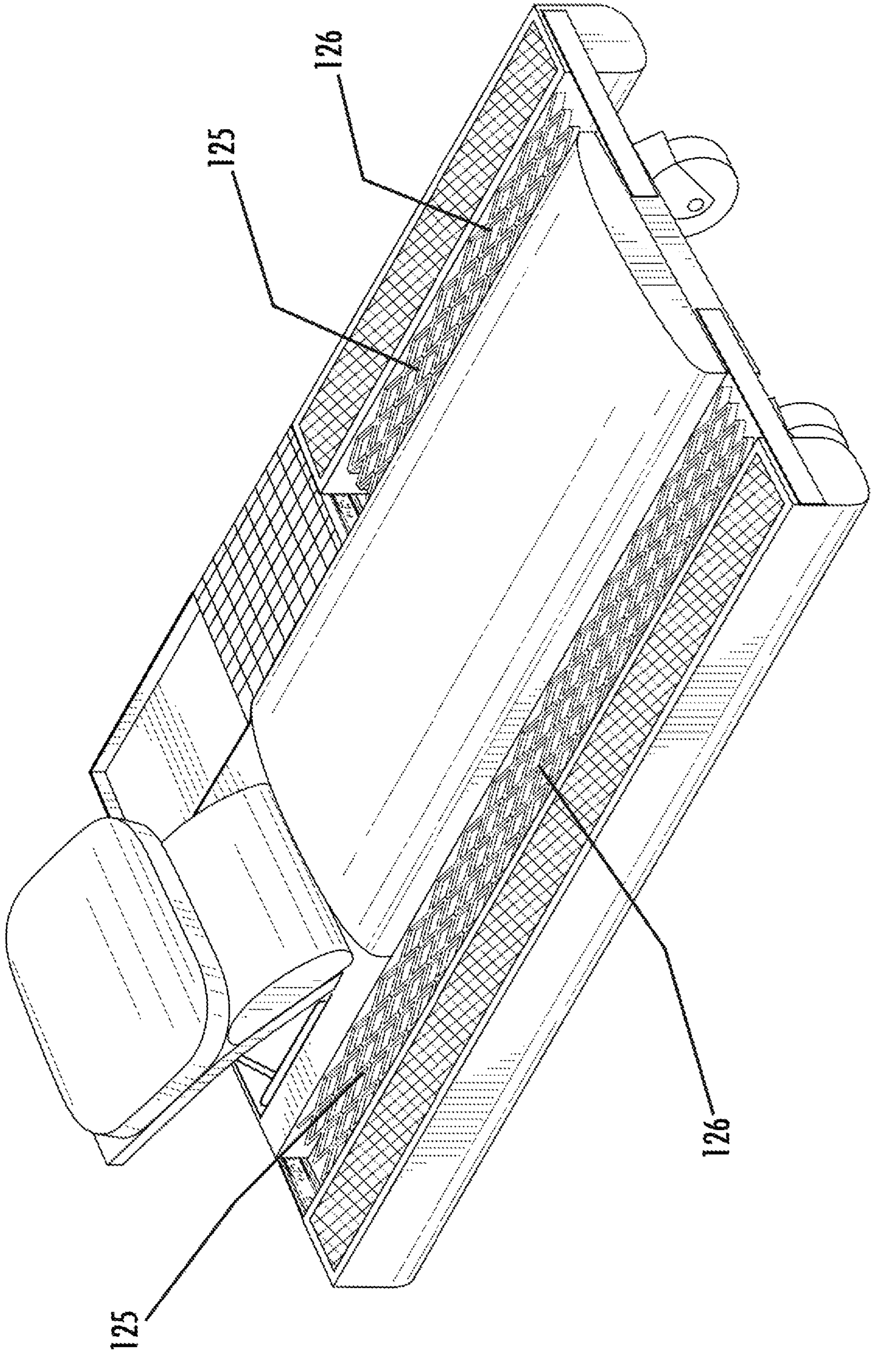
FIG. 10 is a right elevated perspective view of the present mechanic's creeper looking from the foot side towards the head side, including first and second carriers adjacent the creeper and trays with perforated surfaces between the light housings and the creeper support member.

FIG. 10 shows an embodiment of the present creeper in which at least one tray 125 is adapted and configured to fit between a rectangular light housing and the body of the creeper. In the embodiment shown, substantially the entire surface of tray 125 includes perforations 126. Tray 125 may be used by a mechanic to place new, used, or replacement parts of the apparatus being worked on, and perforations 126 may allow dirt, dust, or fluids on those parts to drop down to the floor rather than contaminating the tray. Tray 125 may be made of any suitable material, including metal or plastic, and may be fixedly attached to the inner side of the light housing; that is, the side facing the side of the body of the creeper. When tray 125 is made of a rigid material, such as metal, it may be configured to slide under the body of the creeper when the rectangular light housing is retracted to be adjacent to that side. Alternatively, when tray 125 is made of a flexible material, such as plastic, it may be configured to expand when the rectangular light housing is extended away from the body of the creeper as shown, and compress when the rectangular light housing is retracted against the side of the body of the creeper.

Figure 11:
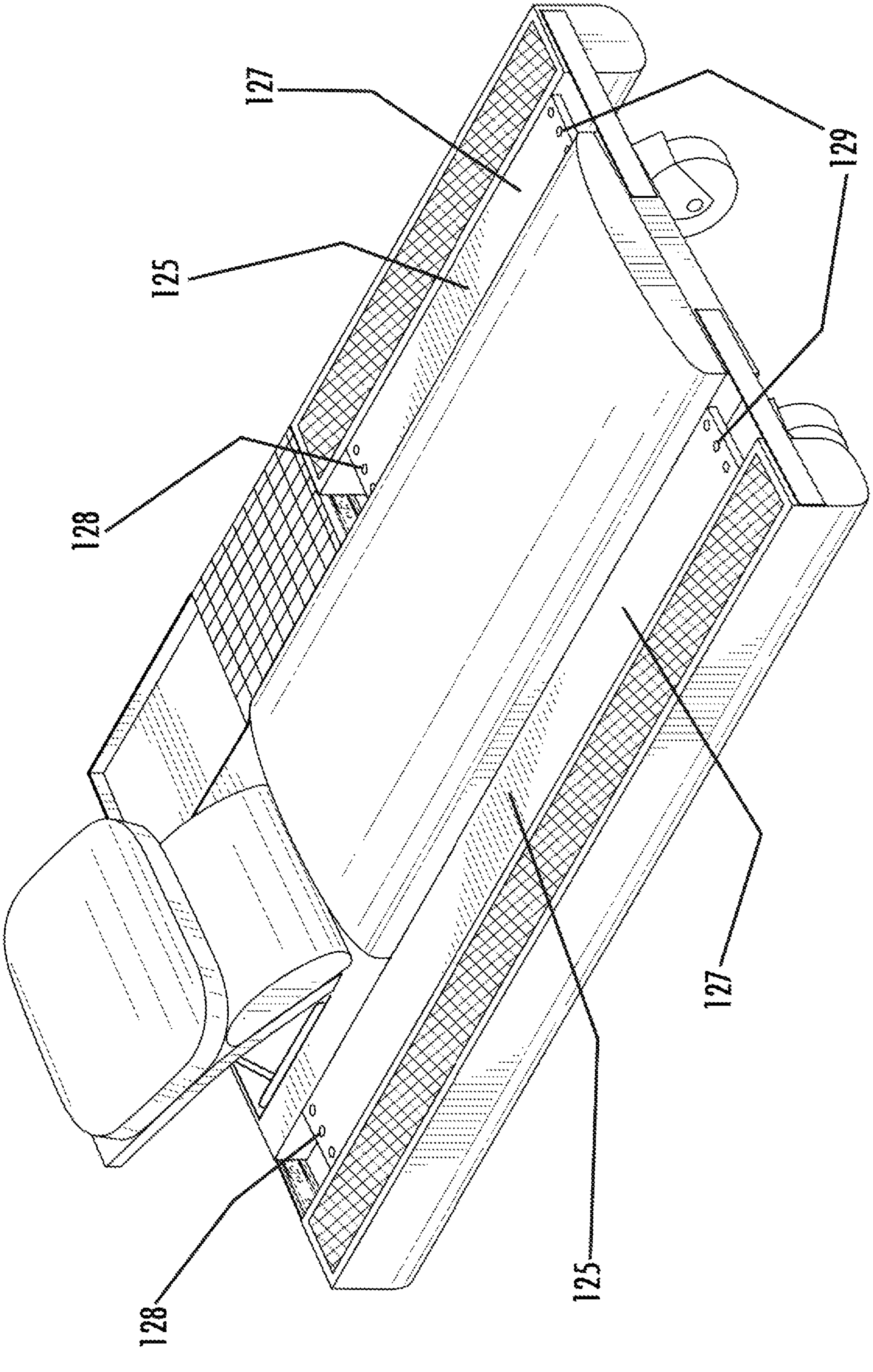
FIG. 11 is a right elevated perspective view of the present mechanic's creeper looking from the foot side towards the head side, including first and second carriers adjacent the creeper and trays with solid surfaces between the light housings and the creeper support member.

FIG. 11 shows a different embodiment of tray 125 in which substantially the entire surface 127 of tray 125 is solid. Tray 125 may again be made of any suitable material, such as metal or plastic. In order to facilitate drainage of any fluids that may be deposited on tray 125, one or more drain holes may be provided in the surface of tray 125. As shown in FIG. 11 there are drain holes 128 at the parts of tray 125 closest the head portion and drain holes 129 at the parts of tray 125 closest the foot portion of the creeper; however, any number, location, and size/configuration of drain holes may be used.

Figure 12:
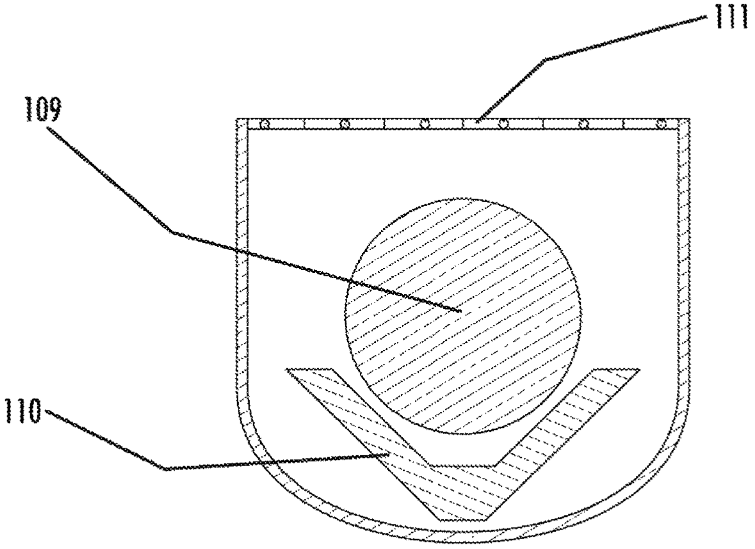
FIG. 12 is an end-on cutaway view of a light housing of the present mechanic's creeper.

FIG. 12 is an end-on cross section of a rectangular light housing of the present creeper. The light housing includes light source 109; reflector 110 located below light source 109; and translucent shield 111 located above light source 109. Light source 109 may be any suitable light source including but not limited to incandescent, fluorescent, halogen, and light-emitting diode (LED). The surface of reflector 110 facing light source 109 is any reflective material that will reflect light from light source 109 in the direction of translucent shield 111. Translucent shield 111 may be of any material that both allows light from light source 109 to exit the rectangular light housing, and provides some protection against an object that falls onto the rectangular light housing from damaging light source 109.

Figure 13:
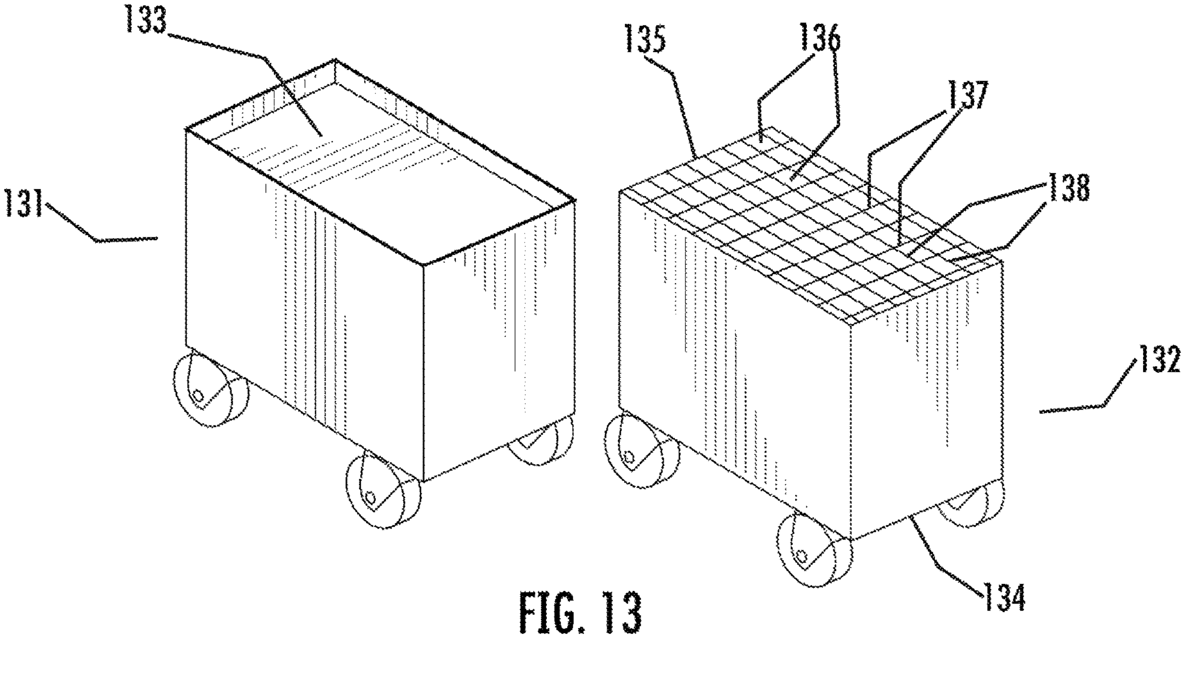
FIG. 13 is a view of the first and second carriers of the present mechanic's creeper.

FIG. 13 shows first carrier 131 and second carrier 132, either or both of which may be part of the present creeper as explained earlier herein. First carrier 131 includes flat, horizontal tray portion 133 which can be used to hold any appropriate object, with non-limiting examples including parts, tools, bottles or cans of fluid, spray cans, gloves, and personal protective equipment (PPE) such as glasses, goggles, and masks. Second carrier 132 may include a second flat, horizontal tray portion 134, which may be the bottom of second carrier 132 or may be located between the bottom and third flat, horizontal tray portion 135. (Any of the flat, horizontal tray portions described herein may be solid or perforated.) Third flat, horizontal tray portion 135 may have a plurality of apertures 136 through which tools may be placed.

Apertures 136 may be formed by a first plurality of dividers 137 and a second plurality of dividers 138 positioned at an angle to first plurality of dividers 137. As shown in FIG. 13, first plurality of dividers 137 run widthwise between the inner and outer walls of the carrier, and second plurality of dividers 138 run lengthwise between the upper and lower walls of the carrier. As used herein, "inner", "outer", "upper", and "lower" are used in relation to the carrier's in-use orientation to the body of the creeper. Therefore, the inner wall faces or is in contact with the side of the creeper body or rectangular light housing, the outer wall is on the opposite side from the inner wall, the upper wall is the vertical wall of the creeper facing towards the head portion of the creeper, and the lower wall is the vertical wall of the creeper facing towards the foot portion of the creeper. Therefore, and also as shown in FIG. 13, first plurality of dividers 137 and second plurality of dividers 138 are at right angles to each other, and apertures 136 are accordingly rectangular. Other configurations are possible and within the present scope, including configuring the first and second pluralities of dividers to form diamond-shaped apertures, and changing the spacing of the first and second pluralities of dividers to provide a range of sizes of apertures suitable to holding different-sized tools or other objects.

Figure 14A:
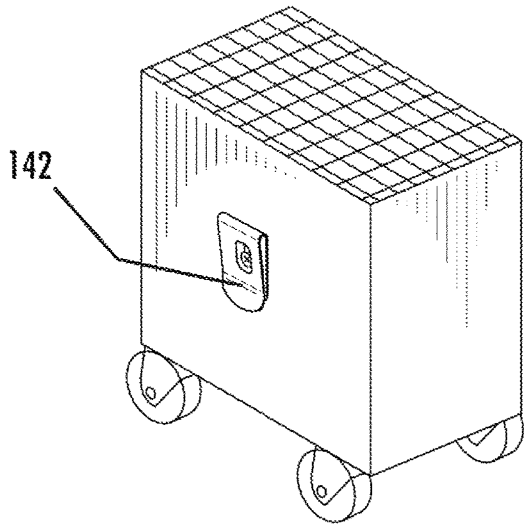
FIGS. 14A-14D show various arrangements for associating the carriers with the light housing or support member.
Figure 14B:
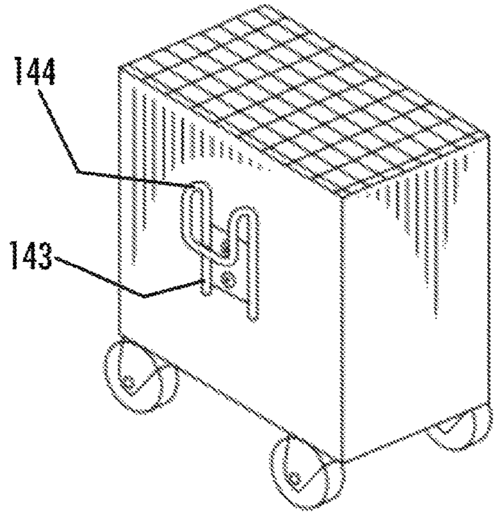
Figure 14C:
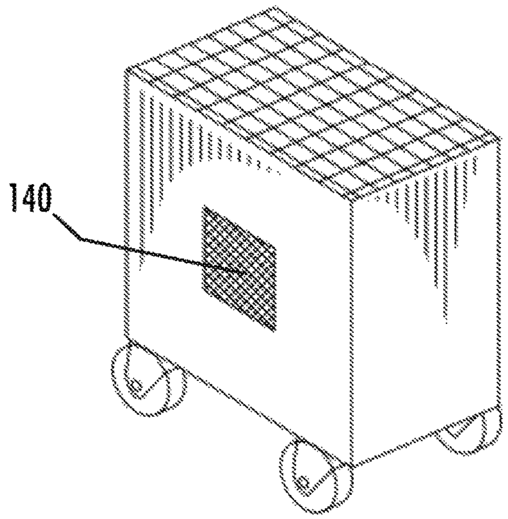
Figure 14D:
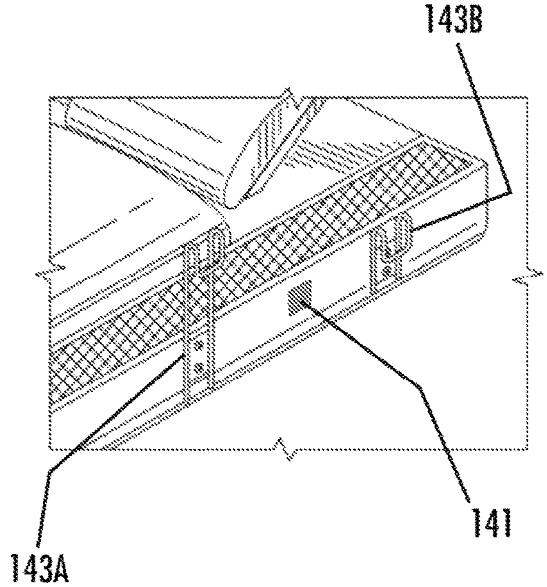

FIGS. 14A through 14D show some representative mechanisms for attaching/associating the carriers to/with the rectangular light housing and/or the side of the creeper body. FIG. 14A shows spring clip 142 attached to the inner wall of the carrier, which may be clipped over a corresponding feature on the outer wall of the rectangular light housing or creeper body, or over the wall itself. FIG. 14B shows a retention member having first, linear end 143 that extends upwardly to second, U-shaped end 144, which may be placed over a corresponding feature on the outer wall of the rectangular light housing or creeper body, or over the wall itself. FIG. 14C shows first magnetic portion 140 that may be aligned with a corresponding magnetic portion on the outer wall of the rectangular light housing or creeper body, allowing the carrier to become associated with and detached from the outer wall of the rectangular light housing or creeper body through magnetic interaction. FIG. 14D shows a second magnetic portion 141 located on the outer wall of a rectangular light housing to interact with first magnetic portion 140, as well as retention members 143A and 143B which are similar to that shown in FIG. 14B but are here mounted on the outer wall of the rectangular light housing. Any suitable mechanism for allowing a carrier to be associated with and dissociated from the creeper body may be used, and may be present on the carrier, on the rectangular light housing, and/or on the creeper body. In the context of the carrier, "associated with" means sufficiently attached, including but not necessarily limited to by physical attachment or magnetic force, so that when the creeper is moved, the carrier moves with it.

Figure 15:
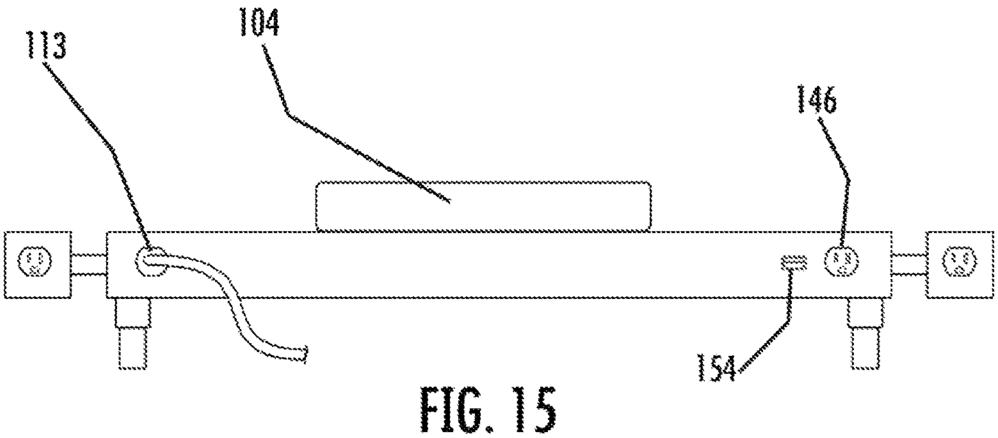
FIG. 15 is an end-on view of the present mechanic's creeper, from the head end.

In order for the rectangular light housings and, where present, snake light to provide illumination, the present creeper includes a source of electricity, which may also be useful for connecting power tools and for using devices with USB power connections. FIG. 15 is an end-on view of the present creeper from the head portion, showing padded head support 104. The creeper includes at least one electric aperture 113 adapted to receive a grounded power connection, such as by being connected to an A/C or other power outlet, which may be an outlet in a structure or one located on a generator, in the space where the work is being done; as shown here, an extension or other power cord is plugged into the aperture. Electric aperture 113 may be electrically connected to grounded outlet 146, so that power supplied to aperture 113 is available to the mechanic via grounded outlet 146. USB port 154 may also be present in order to provide power to certain devices, including but not limited to tools that accept USB charging, cellular phones, and music players. More than one electric aperture, grounded outlet, and USB port may be provided on the present creeper, and as shown in FIG. 15, grounded outlets may be provided on either or both of the rectangular light housings.

Figure 16:
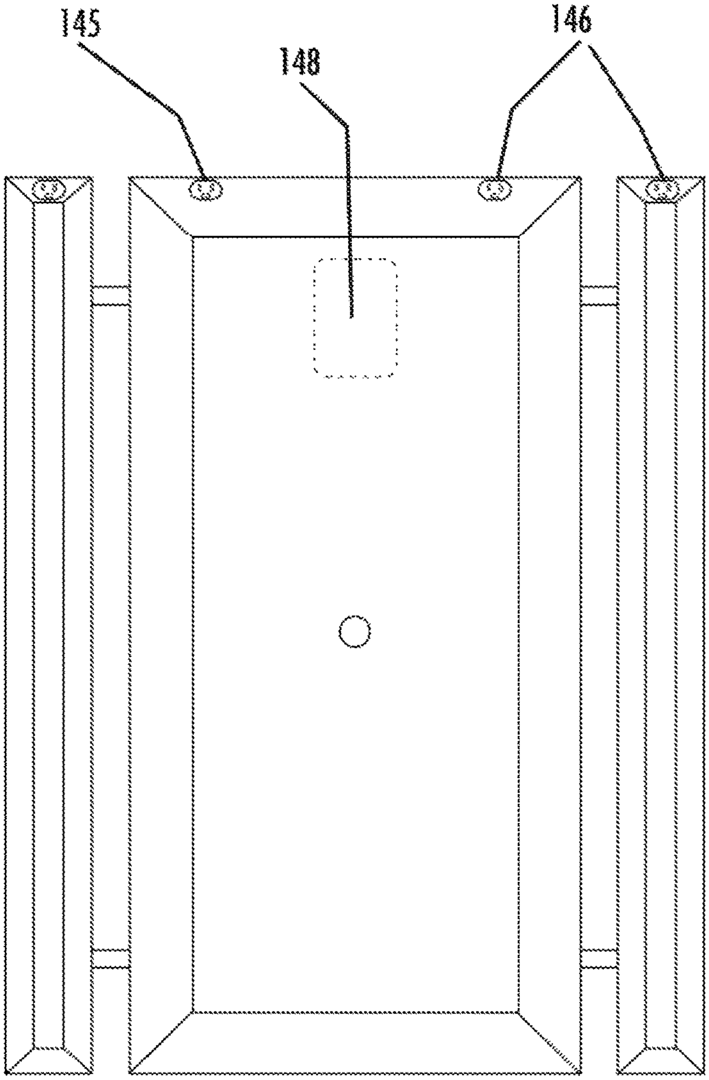
FIG. 16 is a view of the underside of the present mechanic's creeper.

FIG. 16 is a bottom view of the present creeper showing electric aperture 145 adapted to receive a grounded power connection; grounded outlets 146 provided in the body of the creeper and/or a rectangular light housing; and a location 148 for a rechargeable battery mounted to the underside of the creeper body. The rechargeable battery may be charged in place through an electric connection to a power source, or be detached from the creeper for recharging, as well as for replacement. When being charged in place—that is, while still attached to the creeper—the rechargeable battery may be charged through a port on the battery that is connected to a source of power from or external to the creeper, or through an electrical connection that connects to a source of power in the creeper as further discussed below.

Figure 17A:
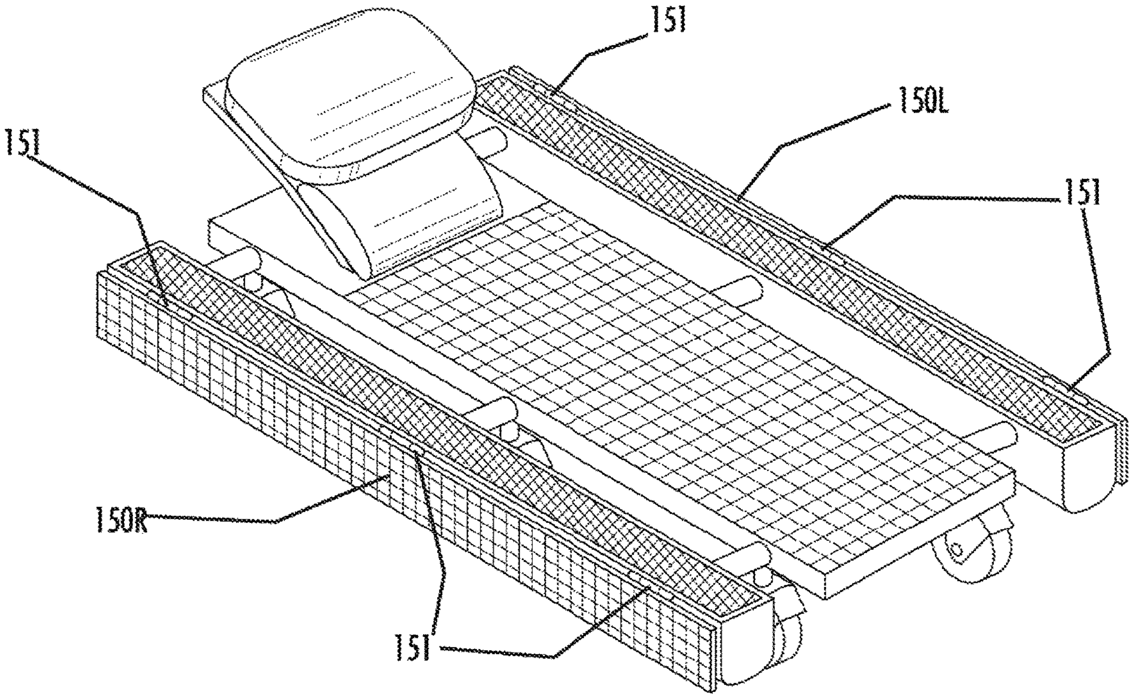
FIGS. 17A-17B are right elevated perspective views of the present mechanic's creeper looking from the foot side towards the head side, showing solar panels in vertical (FIG. 17A) and horizontal (FIG. 17B) positions.
Figure 17B:
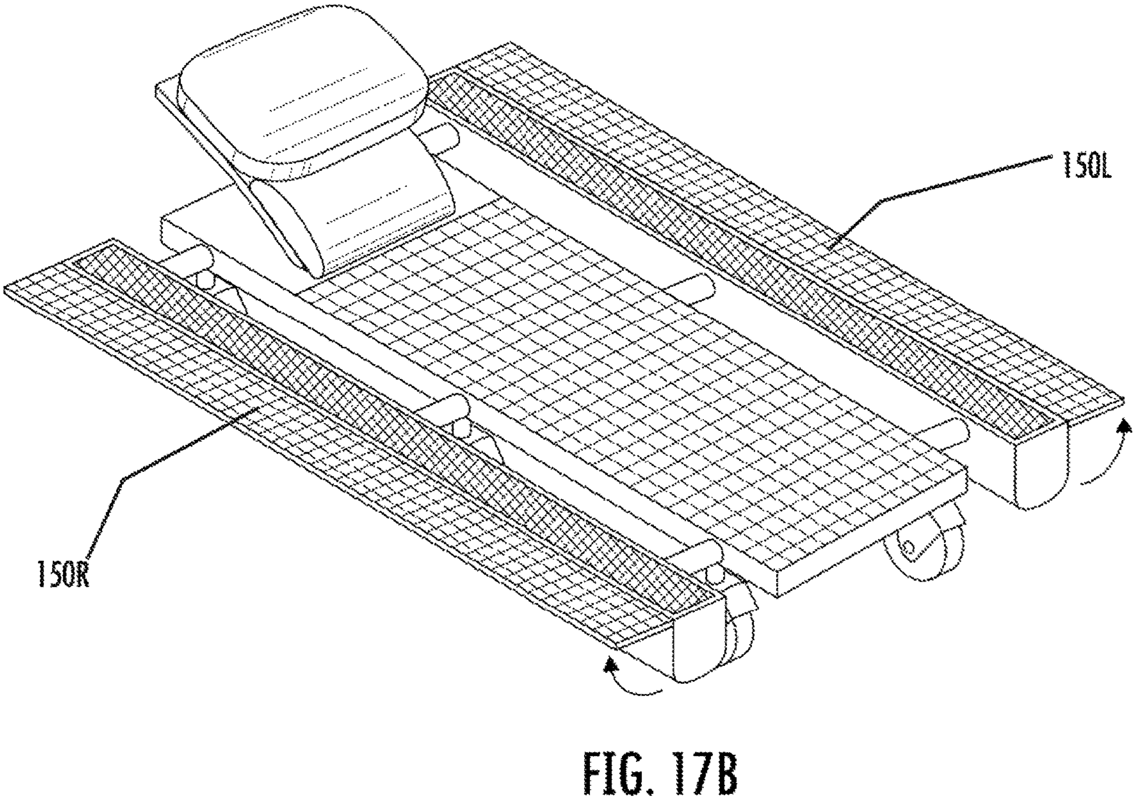

FIGS. 17A and 17B show the present creeper with at least one solar panel to generate electricity from light, such as sunlight. In FIG. 17A, the creeper includes a first solar panel 150L attached to the rectangular light housing on the left side of the creeper body, and a second solar panel 150R attached to the rectangular light housing on the right side of the creeper body. Either the first solar panel or the second solar panel, or both as shown, may be present. The solar panels may be attached to the rectangular light housings by any suitable mechanism that allows them to move between at least a first position in which they are vertical and adjacent the outside wall of the rectangular light housing, as in FIG. A, and a second position in which they are horizontal as in FIG. 17B, where the arrow indicate the direction of movement of the solar panels as they transition from the vertical position of FIG. 17A to the horizontal position of FIG. 17B. In FIG. 17A the solar panels are shown as attached by hinges 151, but any suitable mechanism may be used that allows the solar panels to maintain, and be moved between, the vertical and horizontal positions. The mechanism may allow the solar panels to remain in a position intermediate to the vertical and horizontal positions shown, such as to allow better alignment with the source of light being used to generate electricity with the solar panels. The mechanism may further allow the solar panels to be extended away from the rectangular light housing, and/or to pivot lengthwise. When one of the rectangular light housings is less than the full length of its corresponding rectangular light housing to accommodate the first carrier and/or the second carrier, as shown for example in FIGS. 1, 2, 3, 4, 10, and 11, the solar panel attached to that rectangular light housing may be of the same length as the rectangular light housing.

Figure 18A:
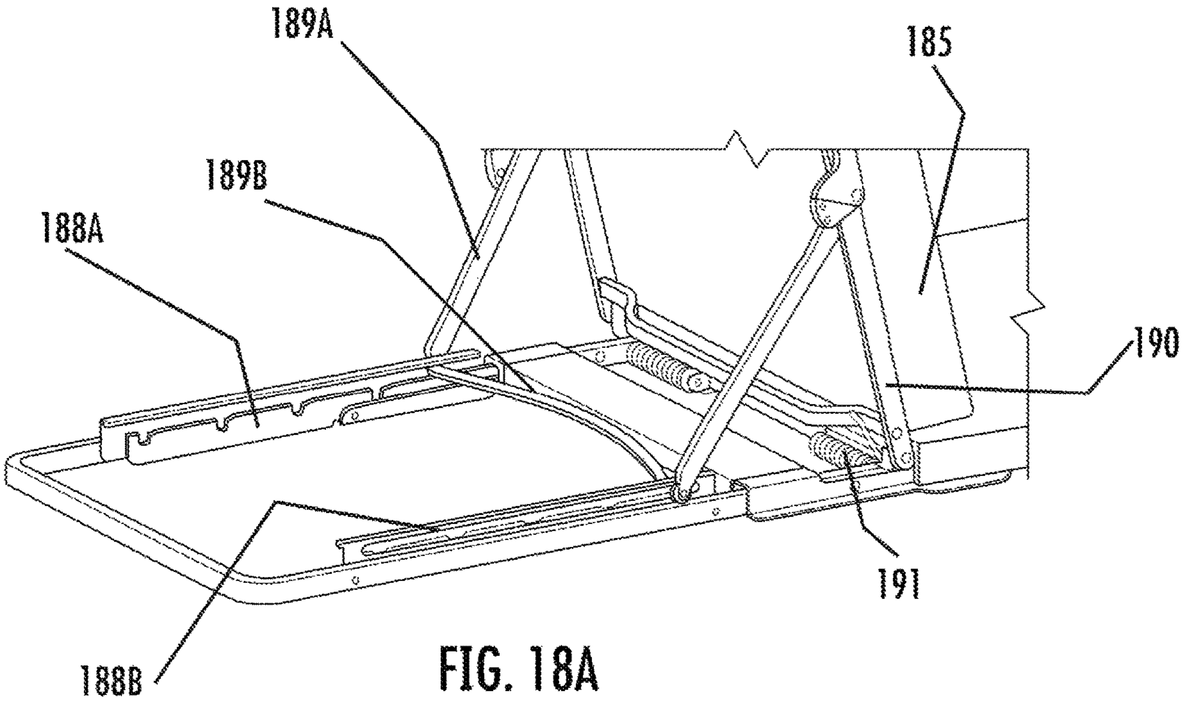
FIGS. 18A-18B are detail views of pivot mechanisms for the padded head support of the present mechanic's creeper.
Figure 18B:
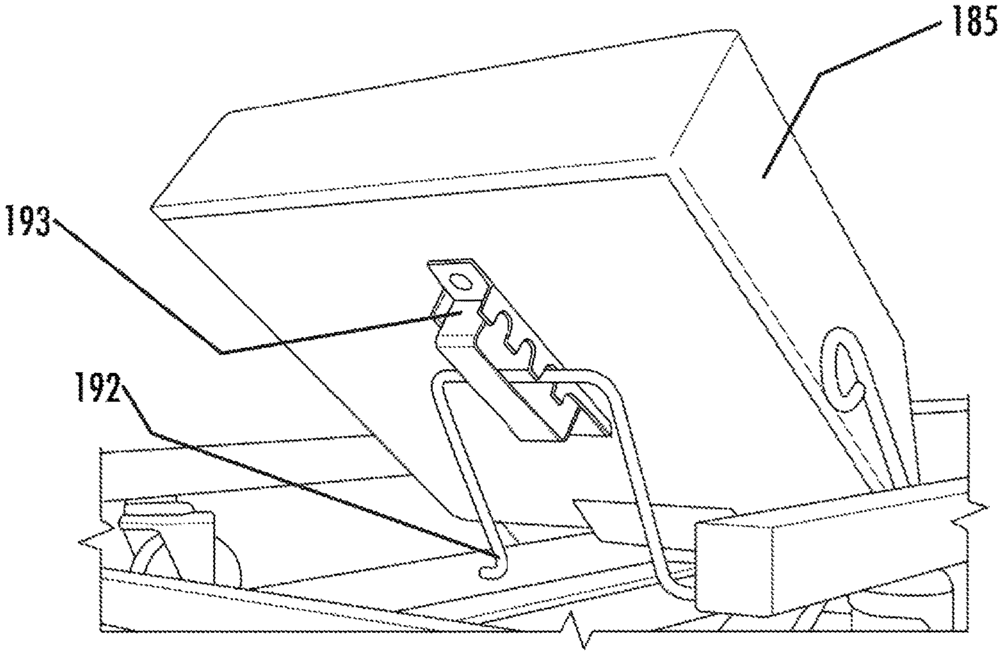

FIGS. 18A and 18B provide non-limiting examples of pivot mechanisms that may be used to adjust the position of the padded head support. Padded head support 185 is supported by hinged pivot support frame 190, which may be biased upwardly by spring(s) 191 to facilitate pivoting the padded head support from a horizontal position to an inclined position as shown. Connecting support piece, or brace, 189A is hingedly connected to support frame 190 at its upper end, and includes retention bar 189B connecting the two side of support brace 189A. Retention bar 189B can be moved among a plurality of notches in first notched track 188A and second notched track 188B. The interaction among hinged pivot support frame 190, brace 189A, retention bar 189B, and the notches in first notched track 188A and second notched track 188B allow padded head support 185 to be placed and maintained at a number of acute angles with respect to the horizontal body of the creeper. FIG. 18B shows an alternative approach in which fixed incline adjustment mechanism 193 is attached to the underside of padded head portion 185, with pivoting support member 192 attached to the creeper body and having an upper U-shaped portion that may be engaged with, and disengaged from, a number of slots in fixed incline adjustment mechanism 193 to place and maintain padded head portion 185 at a number of acute angles with respect to the horizontal body of the creeper. It will be understood that a variety of pivot mechanisms may be used to enable movement of the padded head portion between a horizontal position and a position at an acute angle to the creeper body that is sufficiently stable to securely support the head of a mechanic using the creeper, all of which fall under the present scope.

While the present mechanic's creeper has been described herein with reference to particular embodiments, it will be understood by those skilled in the art that various changes may be made and equivalents may be substituted for elements thereof without departing from the intended scope. In addition, modifications may be made to adapt a particular situation or material to these teachings without departing from the intended scope.

I claim:

1. A creeper comprising:

a) a support member for a human body having a left side, a right side, a head side, and a foot side, said support member further comprising a head portion and a body portion extending from said head portion to said foot side;

b) a padded head support located on said head portion, said padded head support being pivotable upwardly, from a point adjacent said body portion, from a first position substantially horizontal relative to said support member to a second position at an acute angle to said support member;

c) a padded body support located on said body portion;

d) a plurality of wheels mounted to the underside of said support member;

e) a first rectangular light housing connected to said left side of said support member and a second rectangular light housing connected to said right side, wherein one of said first rectangular light housing and said second rectangular light housing extends along substantially the entire length of its respective side of said support member and the other of said first rectangular light housing and said second rectangular light housing extends from the foot side of said support member towards the head side to from one-half the length of its respective side to substantially the entire length of its respective side of said support member, each of said first rectangular light housing and said second rectangular light housing being movable relative to its respective side of said support member between a first, retracted position adjacent the side and a second, extended position horizontally away from the side;

f) each of said first rectangular light housing and said second rectangular light housing containing at least one light source that is an incandescent light source, a fluorescent light source, a halogen light source, or a light-emitting diode light source;

g) a reflector located below each light source and a translucent shield located above each light source; and, h) at least one of:

i) a rechargeable battery mounted to the underside of said support member, ii) at least one electric aperture adapted to receive a grounded connection to a source of alternating current, and iii) at least one solar panel mounted to said creeper, electrically connected to each light housing.

2. The creeper of claim 1 further comprising a plurality of light housing connectors connecting each of first light housing and said second light housing to, respectively, said left side and said right side of said support member, wherein each of said plurality of light housing connectors has a first end connected to the light housing and a second end connected to the support member.

3. The creeper of claim 2, wherein:

a) each first end has a fixed connection to the light housing and each second end has a movable connection to the support member;

b) each first end has a movable connection to the light housing and each second end has a fixed connection to the support member;

c) each first end has a movable connection to the light housing and each second end has a movable connection to the support member; or, d) each first end has a fixed connection to the light housing and each second end has a fixed connection to the support member.

4. The creeper of claim 2 wherein each first end has a fixed connection to the light housing and each second end has a movable connection to the support member, further wherein said moveable connection comprises an aperture in the side of the support member through which each of said plurality of light housing connectors is movable to move the light housing towards and away from said support member.

5. The creeper of claim 2 wherein at least one light housing connector comprises a slide rail assembly, said slide rail assembly having a first end fixedly connected to the light housing and a second end fixedly connected to the support member, said slide rail assembly comprising at least first and second parts being moveable relative to each other as the light housing moves between its retracted and extended positions.

6. The creeper of claim 5 further comprising at least one tray arranged and configured to occupy the horizontal area between the light housing and the support member when the light housing is fully extended away from the support member.

7. The creeper of claim 6 wherein said tray is attached to the side of the light housing facing the support member and is configured and arranged to slide under the support member when the light housing is moved to its retracted position adjacent the side.

8. The creeper of claim 6 wherein said tray is configured and arranged to be removably placed into the space between the light housing and the support member when the light housing is fully extended away from the support member.

9. The creeper of claim 6 wherein substantially the entire surface of said tray is perforated.

10. The creeper of claim 6 wherein substantially the entire surface of said tray is solid and comprises at least one drain hole at an end of said tray closest to said head side and at least one drain hole at an end of said tray closest to said foot side.

11. The creeper of claim 2 wherein at least one light housing connector comprises an accordion structure having a first end fixedly connected to the light housing and a second end fixedly connected to the support member, said accordion structure being operable to, respectively, contract and extend when the light housing is moved between retracted and extended positions.

12. The creeper of claim 1 further comprising:

a) a first carrier and a second carrier, b) each of said first carrier and said second carrier being rectangular and having a length, a width, and a height, and being adapted to attach to at least one of said left side and said right side of said support member at a region on their lengths;

c) wherein the light housing on the same side of said support member where said first carrier and said second carrier are adapted to attach has a length less than the entire length of said support member;

d) further wherein the combined lengths of said first carrier, said second carrier, and said light housing are equal to or less than the entire length of said support member;

e) Said first carrier comprising a first flat, horizontal tray portion and said second carrier comprising a second flat, horizontal tray portion;

f) said second flat, horizontal tray portion further comprising a third horizontal portion supported vertically above said second flat, horizontal tray portion, said third horizontal portion comprising a plurality of apertures through which tools may be placed, said plurality of apertures formed by a first plurality of dividers and a second plurality of dividers positioned at an angle to said first plurality of dividers.

13. The creeper of claim 12 further comprising a third light housing having a length equal to the combined lengths of said first carrier and said second carrier and adapted to be attached to and removed from the side of said support member where said first carrier and said second carrier are adapted to attach.

14. The creeper of claim 12 wherein said first carrier and said second carrier are removably attached to either of (1) a side of a support member or (2) a side of a rectangular light housing, by at least one of:

a) a first magnetic portion on a side of the carrier and a second magnetic portion on an outside side wall portion of the support member or light housing;

b) a spring clip on a side of the carrier adapted to be brought over an outside side wall portion of the support member or the light housing; and c) a retention member having a first, linear end extending upwardly to a second, U-shaped end, wherein said linear end is adapted to be attached to one of i) a side of the carrier, ii) an outside side wall portion of the light housing, and iii) a side of the support member, and said second, U-shaped end is adapted to be placed over, respectively, iv) an outside side wall portion of the light housing, and v) a side wall portion of the carrier.

15. The creeper of claim 1 further comprising at least one electric aperture adapted to receive a grounded connection to a source of alternating current, and at least one grounded outlet electrically connected to said at least one electric aperture.

16. The creeper of claim 15 further comprising:

a) a rechargeable battery mounted to the underside of said support member, b) a snake light mounted adjacent said head portion, and c) at least one solar panel attached to a light housing through a hinged connection configured to allow movement of said solar panel between a first position in which said solar panel is adjacent to and coplanar with an outside side wall of the light housing and a second position in which said solar panel is normal to the outside side wall and coplanar with said support member, further wherein at least one of said electric aperture and said rechargeable battery is electrically connected to said first light housing, said second light housing, said snake light, and said at least one grounded outlet, and said at least one solar panel is electrically connected to at least one of said rechargeable battery, said first light housing, said second light housing, and said snake light.

17. The creeper of claim 16, further wherein said rechargeable battery is removeable from said support member and configured to be rechargeable while removed.

18. The creeper of claim 16 further comprising at least one USB port electrically connected to at least one of said electric aperture, said rechargeable battery, or said at least one solar panel.

19. A creeper comprising:

a) a planar support for a human body having a left side, a right side, a head side, and a foot side, said planar support having a solid surface connecting all sides;

b) said planar support member comprising a padded head portion and a padded body portion, said padded head portion being pivotable upwardly, from a point adjacent said padded body portion, from a first position substantially horizontal relative to said planar support to a second position at an acute angle to said planar support;

c) a plurality of wheels mounted to the underside of said planar support;

d) a first rectangular light housing connected to said left side of said planar support and a second rectangular light housing connected to said right side, wherein one of said first rectangular light housing and said second rectangular light housing extends along substantially the entire length of its respective side of said planar support and the other of said first rectangular light housing and said second rectangular light housing extends from the foot side of said planar support towards the head side to from one-half the length of its respective side to substantially the entire length of its respective side of said planar support, each of said first rectangular light housing and said second rectangular light housing being movable relative to its respective side of said planar support between a first, retracted position adjacent the side and a second, extended position horizontally away from the side;

e) each of said first rectangular light housing and said second rectangular light housing containing at least one light source that is an incandescent light source, a fluorescent light source, a halogen light source, or a light-emitting diode light source;

f) A reflector located below each light source and a translucent shield located above each light source; and, g) at least one of:

i) a rechargeable battery mounted to the underside of said planar support, ii) at least one electric aperture adapted to receive a grounded connection to a source of alternating current, and iii) at least one solar panel mounted to said creeper, h) electrically connected to each light housing.

20. The creeper of claim 19 further comprising a plurality of light housing connectors connecting each of said first light housing and said second light housing to, respectively, said left side and said right side of said planar support, wherein each of said light housing connectors comprises a first end connected to a light housing and a second end connected to its respective side of said planar support.

21. The creeper of claim 20, wherein:

a) each first end has a fixed connection to the light housing and each second end has a movable connection to the side;

b) each first end has a movable connection to the light housing and each second end has a fixed connection to the side;

c) each first end has a movable connection to the light housing and each second end has a movable connection to the side; or, d) each first end has a fixed connection to the light housing and each second end has a fixed connection to the side.

22. The creeper of claim 21 wherein each first end has a fixed connection to the light housing and each second end has a movable connection to a side, further wherein said moveable connection comprises an aperture in the side through which each of said plurality of light housing connectors is movable towards and away from said side.

23. A creeper comprising:

a) a planar frame including a left side rail, a right side rail, a head rail, and a foot rail;

b) a planar support member for a human body supported by said planar frame, said planar support member comprising a padded head portion and a padded body portion, said padded head portion being pivotable upwardly, from a point adjacent said padded body portion, from a first position substantially horizontal relative to said planar support member to a second position at an acute angle to said planar support member;

c) a plurality of wheels mounted to the underside of at least one of said planar frame and said planar support member;

d) a first rectangular light housing connected to said left side rail and a second rectangular light housing connected to said right side rail, wherein one of said first rectangular light housing and said second rectangular light housing extends along substantially the entire length of its respective side rail and the other of said first rectangular light housing and said second rectangular light housing extends from said foot rail towards said head rail to from one-half the length of its respective side rail to substantially the entire length of its respective side rail of said planar support member, each of said first rectangular light housing and said second rectangular light housing being movable relative to its respective side rail between a first, retracted position adjacent the side rail and a second, extended position horizontally away from the side rail;

e) each of said first rectangular light housing and said second rectangular light housing containing at least one light source that is an incandescent light source, a fluorescent light source, a halogen light source, or a light-emitting diode light source;

f) A reflector located below each light source and a translucent shield located above each light source; and, g) at least one of:

i) a rechargeable battery mounted to the underside of said creeper, ii) at least one electric aperture adapted to receive a grounded connection to a source of alternating current, and iii) at least one solar panel mounted to said creeper, electrically connected to each light housing.

24. The creeper of claim 23 further comprising a plurality of light housing connectors connecting each of said first light housing and said second light housing to, respectively, said left side rail and said right side rail, wherein each of said first plurality and said second plurality of light housing connectors has a first end connected to the light housing and a second end connected to its respective side rail.

25. The creeper of claim 24, wherein:

a) each first end has a fixed connection to the light housing and each second end has a movable connection to the side rail;

b) each first end has a movable connection to the light housing and each second end has a fixed connection to the side rail;

c) each first end has a movable connection to the light housing and each second end has a movable connection to the side rail; or, d) each first end has a fixed connection to the light housing and each second end has a fixed connection to the side rail.

* * * * *